(12) United States Patent
Iwasawa et al.

(10) Patent No.: US 9,507,132 B2
(45) Date of Patent: Nov. 29, 2016

(54) ZOOM LENS AND IMAGING APPARATUS

(71) Applicant: Tamron Co., Ltd., Saitama-shi (JP)

(72) Inventors: Yoshito Iwasawa, Saitama (JP); Dayong Li, Saitama (JP)

(73) Assignee: Tamron Co., Ltd., Saitama (JP)

( * ) Notice: Subject to any disclaimer, the term of this patent is extended or adjusted under 35 U.S.C. 154(b) by 29 days.

(21) Appl. No.: 14/565,980

(22) Filed: Dec. 10, 2014

(65) Prior Publication Data

US 2015/0168696 A1 Jun. 18, 2015

(30) Foreign Application Priority Data

Dec. 18, 2013 (JP) .................. 2013-260998

(51) Int. Cl.
- *G02B 15/14* (2006.01)
- *G02B 15/173* (2006.01)
- *H04N 5/232* (2006.01)

(52) U.S. Cl.
CPC ............. *G02B 15/14* (2013.01); *G02B 15/173* (2013.01); *H04N 5/23296* (2013.01)

(58) Field of Classification Search
CPC .. G02B 15/173; G02B 15/28; G02B 13/009; G02B 15/14; G02B 15/163; G02B 15/167; G02B 15/24; H04N 5/23296
USPC .................. 359/687, 676, 683–685
See application file for complete search history.

(56) References Cited

U.S. PATENT DOCUMENTS

| | | | | |
|---|---|---|---|---|
| 2006/0098302 A1* | 5/2006 | Miyajima et al. | ... | G02B 15/173 359/687 |
| 2008/0204892 A1* | 8/2008 | Satori | .................. | G02B 15/173 359/676 |
| 2011/0080653 A1 | 4/2011 | Kimura | | |
| 2013/0300868 A1* | 11/2013 | Yamamoto | ........... | G02B 15/173 348/143 |
| 2014/0313592 A1* | 10/2014 | Ito | ......................... | G02B 15/173 359/687 |
| 2015/0085153 A1* | 3/2015 | Souma | ............... | G02B 27/0062 348/220.1 |

FOREIGN PATENT DOCUMENTS

| | | |
|---|---|---|
| JP | 2011081113 A | 4/2011 |
| JP | 5100411 B2 | 10/2012 |

* cited by examiner

*Primary Examiner* — Jordan Schwartz

(74) *Attorney, Agent, or Firm* — The Webb Law Firm

(57) ABSTRACT

An object of the present invention is to provide a low-cost, miniature, wide-angle high-zoom-ratio zoom lens that has high imaging performance, and an imaging apparatus equipped with the zoom lens. To achieve the object, a zoom lens including a first lens group having positive refracting power, a second lens group having negative refracting power and a third lens group having positive refracting power in order from an object side in which a lens group P having positive refracting power is arranged closer to an image plane side than the third lens group.

8 Claims, 24 Drawing Sheets

ZOOM LENS AND IMAGING APPARATUS

CROSS-REFERENCE TO RELATED APPLICATION

This application claims priority to Japanese Patent Application No. 2013-260998 filed Dec. 18, 2013, the disclosure of which is hereby incorporated in its entirety by reference.

BACKGROUND OF THE INVENTION

Field of the Invention

The present invention relates to a zoom lens and an imaging apparatus equipped with the zoom lens. In particular, the present invention relates to a miniature zoom lens that has a high magnification change ratio and enables wide-angle imaging, and an imaging apparatus equipped with the zoom lens.

Background Art

Imaging apparatuses using solid image sensors such as a compact digital camera and a digital single lens reflex camera have been popular. Accordingly, market needs for a zoom lens adjustable the focal length depending on an object as an optical system of an imaging apparatus increase. Especially, demand for not only a miniaturized zoom lens that has high imaging performance and high magnification change ratio but also wide-angle and low cost for such zoom lenses increases. For example, Japanese Patent Laid-Open No. 2011-081113 discloses a wide-angle high-magnification zoom lens in which a half image viewing angle at wide-angle end exceeds 80 degrees and the magnification change ratio is about 30. Meanwhile, Japanese Patent No. 5100411 discloses a zoom lens that has a high magnification change ratio suitable for an interchangeable lens used in a lens-interchangeable imaging apparatus.

DOCUMENTS CITED

Patent Documents

Patent Document 1: Japanese Patent Laid-Open No. 2011-081113
Patent Document 2: Japanese Patent No. 5100411

By the way, depending on wide spreading lens-interchangeable imaging apparatuses, demand for a zoom lens for an interchangeable lens which satisfies the demand described above increases. In view of this point, although the wide-angle high-magnification zoom lens disclosed in Japanese Patent Laid-Open No. 2011-081113 is a zoom lens for a compact digital camera, the lens is not applicable as an interchangeable lens used in the lens-interchangeable imaging apparatus since the back focus is short. It is because, a component related to an optical viewfinder such as a reflex mirror should be disposed between an imaging element and a lens to secure a constant back focus in the lens-interchangeable imaging apparatus such as a digital single lens reflex camera. Meanwhile, although the zoom lens disclosed in Japanese Patent No. 5100411 secures a constant back focus and is a zoom lens with a high magnification change ratio suitable for the interchangeable lens used in the lens-interchangeable imaging apparatus, the half image viewing angle at wide-angle end is about 38° and the matter does not sufficiently satisfy a demand for wide-angle.

So, an object of the present invention is to provide a low-cost, miniature, wide-angle high-zoom-ratio zoom lens that has high imaging performance, and an imaging apparatus equipped with the zoom lens.

SUMMARY OF THE INVENTION

As a result of intensive studies, the present inventors have achieved the object by employing the zoom lens described later.

The zoom lens according to the present invention includes a first lens group having positive refracting power, a second lens group having negative refracting power and a third lens group having positive refracting power in order from an object side; a lens group P having positive refracting power is arranged closer to an image plane side than the third lens group; and satisfies conditional expressions (1) to (3) described below.

$$-1.30 < \beta rw < -0.80 \quad (1)$$

$$-0.21 < \beta 2w/\tan\theta w < -0.12 \quad (2)$$

$$0.55 < fp/\sqrt{(fw \times ft)} < 1.20 \quad (3)$$

where
  $\beta rw$: Synthetic lateral magnification at wide-angle end of lens group arranged closer to image plane side than the second lens group
  $\beta 2w$: Lateral magnification of the second lens group at wide-angle end
  $\theta w$: Half image viewing angle of most off-axis beam at wide-angle end
  fp: Focal length of the lens group P
  fw: Focal length of entire optical system at wide-angle end
  ft: Focal length of entire optical system at telephoto end In the zoom lens according to the present invention, it is preferable that the first lens group satisfies conditional expression (4) described below.

$$1.33 < f1/\sqrt{(fw \times ft)} < 2.20 \quad (4)$$

where
f1: Focal length of the first lens group

In the zoom lens according to the present invention, it is preferable that the third lens group and the lens group P satisfy conditional expression (5) described below.

$$1.05 < mp/m3 < 1.50 \quad (5)$$

where
  mp: Movement of the lens group P in magnification change from wide-angle end to telephoto end
  m3: Movement of the third lens group in magnification change from wide-angle end to telephoto end In the zoom lens according to the present invention, it is preferable that the second lens group satisfies expression (6) described below.

$$0.23 < (\beta 2t/\beta 2w)/(ft/fw) < 0.50 \quad (6)$$

where
$\beta 2t$: Lateral magnification at telephoto end of the second lens group In the zoom lens according to the present invention, it is preferable that the second lens group satisfies conditional expressions (7) described below.

$$-0.30 < f2/\sqrt{(fw \times ft)} < -0.16 \quad (7)$$

where
f2: Focal length of the second lens group

In the zoom lens according to the present invention, at least one surface of the lens arranged closest to an image plane side in the second lens group is aspheric.

In the zoom lens according to the present invention, it is preferable that focusing from infinity to a close object is performed by moving the second lens group along an optical axis and the zoom lens satisfies conditional expression (8) described below.

$$-0.99<\beta 2t<-0.50 \qquad (8)$$

where

β2t: Lateral magnification at telephoto end of the second lens group

An imaging apparatus according to the present invention is equipped with the zoom lens according to the present invention and an image sensor at the imaging side that converts an optical image formed by the zoom lens into an electrical signal.

The present invention provides a miniature, wide-angle high-zoom-ratio zoom lens that has high imaging performance, and an imaging apparatus equipped with the zoom lens.

DETAILED DESCRIPTION OF THE PREFERRED EMBODIMENTS

Figure 1:
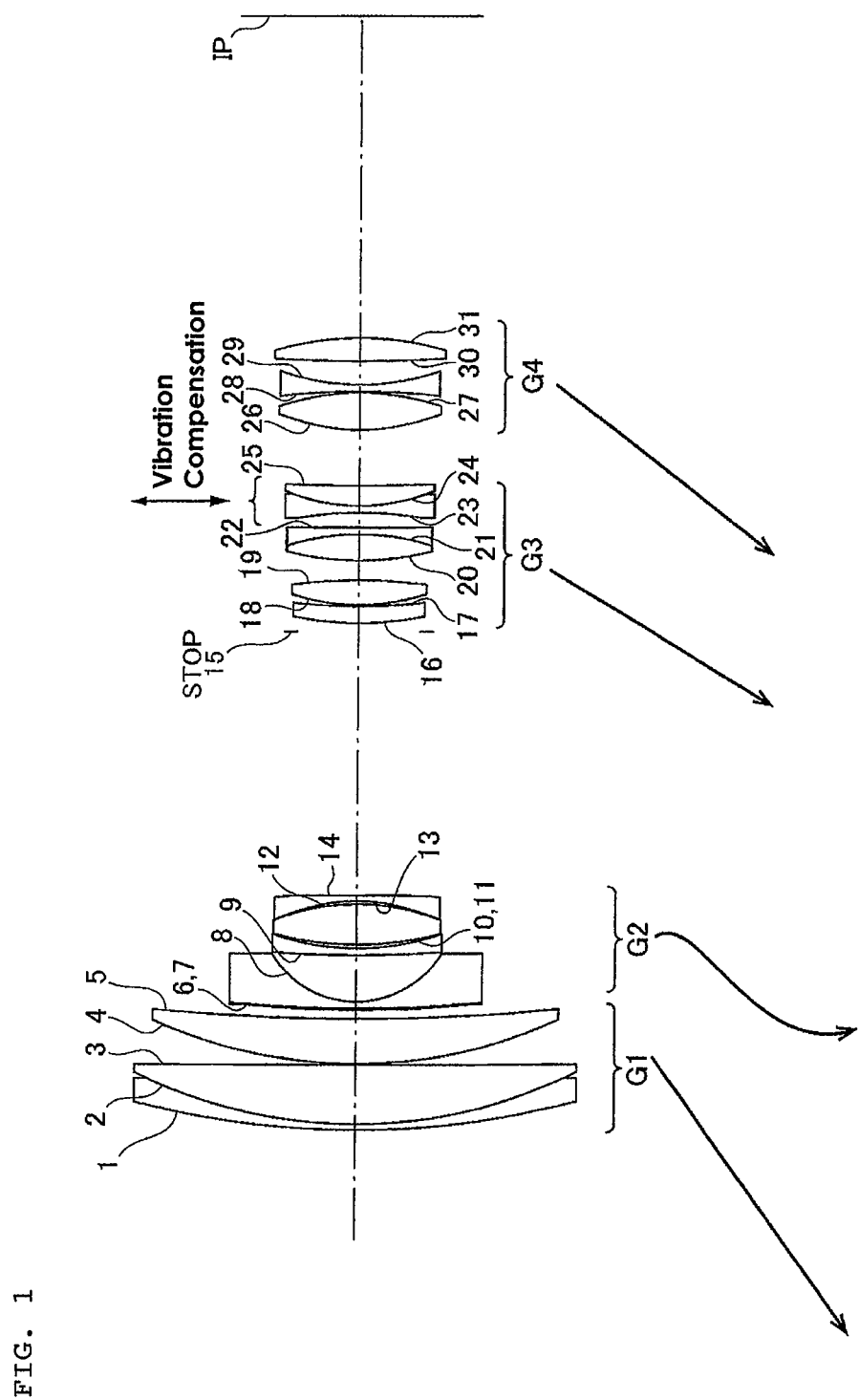
FIG. 1 is a cross-sectional view of optical system illustrating a lens cross section in infinity focusing at wide-angle end and movement of each lens group in zooming of the zoom lens according to the present invention in Example 1.

Embodiments of a zoom lens and imaging apparatus according to the present invention will be described.
1. Zoom Lens
1-1. Structure of Optical System The structure of an optical system of the zoom lens according to the present invention will be described. The zoom lens according to the present invention includes a first lens group having positive refracting power, a second lens group having negative refracting power and a third lens group having positive refracting power in order from an object side; a lens group P having positive refracting power is arranged closer to the image plane side than the third lens group; and the zoom lens satisfies conditional expressions (1) to (3) described later. By employing such refracting power arrangement and satisfying conditional expressions (1) to (3) described later, a zoom lens can achieve not only high imaging performance and a high magnification change ratio but also miniaturization and wide-angle imaging. Specifically, the miniature zoom lens can achieve high imaging performance in which the image viewing angle at wide-angle end is 75° or more and the magnification change ratio is 12 or more.

Regarding "lens group P having positive refracting power is arranged closer to the image plane side than the third lens group" in the present invention, the lens group P having positive refracting power may be just arranged at the image plane side of the third lens group, i.e. just the lens group P may be arranged at the image plane side of the third lens group; or any lens groups may be arranged together with the lens group P.

For example, if the lens group P having positive refracting power is arranged closer to the image plane side than the third lens group, the optical system having four lens groups arranged positive/negative/positive/positive reduces the number of lens groups constituting the optical system and the structure achieves the effect described above and results downsizing and cost reduction in the zoom lens according to the present invention.

Further, other lens groups arranged closer to the image plane side than the third lens group make the degree of freedom of aberration correction in magnification change improve and achieve higher imaging performance. If other lens groups are arranged closer to the image plane side than the third lens group, although the refracting power and arrangement are not especially limited, it is preferable to arrange a lens group having negative refracting power at the image plane side than the third lens group and object side than the lens group P having positive refracting power, for example. Employment of the five-group structure arranged positive/negative/positive/negative/positive from the object side improves the degree of freedom of aberration correction in magnification change of the zoom lens and secure an effect to hinder deviation of spherical aberration and image distortion in magnification change. So, an optical system having high imaging performance in the whole zooming range is provided.

Although the number of other lens groups may be plural, increased number of lens groups arranged closer to the image plane side than the third lens group is not preferable since increased number of lenses increases the total optical length and the weight. Moreover, increased number of lenses increases the cost also. So, the number of other lens groups is preferable to be 1 or less from the viewpoint to achieve the downsizing of a zoom lens having high imaging performance with low cost.

Regarding specific lens arrangements of the first to the third lens groups and the lens group P, an arbitrary appropriate structure may be employed without departing from the scope of the present invention.

From the viewpoint of achieving higher imaging performance, it is preferable that at least one surface of a lens arranged closest to the image plane side in the second lens group is aspheric. If at least one of the object side surface and image plane side surface of a lens arranged closest to the image plane side in the second lens group is aspheric, correction of both the spherical aberration at telephoto end and the image distortion at wide-angle end are made easy. Moreover, the aspheric surface provided on the lens arranged closest to the image plane side in the second lens group is preferable to be aspheric shape which weaken the refracting power of the paraxial curvature to achieve an effect related to the correction of spherical aberration at telephoto end.

Also, from the viewpoint of achieving higher imaging performance, at least one surface of any of lenses constituting the lens group P is preferable to be aspheric. If at least one surface of any lens among the lenses constituting the lens group P arranged closer to the image plane side than the third lens group is aspheric, correction of off-axis coma aberration is made easy. The aspheric surface is preferable to be an aspheric shape which weaken the refracting power of paraxial curvature to achieve an effect related to the correction of the off-axis coma aberration.

The specific lens construction of the lens group P is not especially limited, and the effect described above may be achieved by making at least one surface of any lens among the lenses constituting the lens group P aspheric. In the model, it is preferable to make any one surface of the lenses arranged closest to the object side of the lens group P aspheric to achieve the effect described above. In addition, it is more preferable to make the lens arranged closest to the object side of the lens group P a lens having positive refracting power and any one of surface of the lens having the positive refracting power to be aspheric, and further preferable to make both surfaces to be aspheric.

In addition, the lens group P is preferable to be constituted by three lenses including a lens having positive refracting power, a lens having negative refracting power and a lens having positive refracting power in order from the object side. Constituting of the lens group P by three lenses of a positive/negative/positive makes correction of both off-axis coma aberration and image distortion easy. If such structure is employed, appropriate correction of aberration by a small number of lenses is achieved, and is effective for miniaturization of the zoom lens since the thickness of lens group can be reduced by employing arrangement of positive/negative/positive.

1-2. Movement

Next, magnification change and focusing in the zoom lens having the structure described above will be described in order.

(1) Magnification Change

Magnification change will be described. In the zoom lens according to the present invention, movement of each lens group in magnification change is not especially limited. However, from the viewpoint of improving the degree of freedom in aberration correction to achieve high imaging performance in the entire zooming range, relative movement of each lens group is preferable for gaps change between lens groups of the first to the fifth lens groups in magnification change. It is because, position adjustment of each lens group to a position preferable for aberration correction at each magnification change ratio is made easy if the gaps between the lens groups vary in magnification change. In the model, the gaps between the lens groups may change independently by moving all lens groups in magnification change, or integrally moving a part of lens groups among all lens groups and the rest lens groups may independently move. Alternatively, all lens groups may not be a move group, and a part of lens groups may be a fixed lens group.

In addition, the first lens group is preferable to move to the object side in magnification change from the wide-angle end to the telephoto end in the present invention. Movement of the first lens group to the object side achieves miniaturization of the total optical length direction at wide-angle end. Moreover, such movement of the first lens group is advantageous to achieve miniaturization in the radial direction of lenses constituting the first lens group.

The third lens group and the lens group P is preferable to move to the object side in magnification change from the wide-angle end to the telephoto end. The aberration deviation in magnification change can be appropriately corrected since the third lens group and the lens group P have positive refracting power and the magnification change is shared among each lens group constituting the optical system by moving both lens groups to the object side. Moreover, reduction in the number of lenses constituting the lens groups achieves miniaturization and cost reduction of the zoom lens because of appropriate correction of the aberration deviation in magnification change.

Moreover in the model, although movement in magnification change may be the same in the third lens group and the lens group P, movement of the lens group P in magnification change from the wide-angle end to the telephoto end is preferable to be larger than that of the third lens group. That is, it is preferable that both lens groups move to the object side but the lens group P approaches to the third lens group. Such movement of the third lens group and the lens group P in magnification change is preferable to achieve both more excellent imaging performance in the zoom lens and miniaturization of the zoom lens. The matter will be described in detail in interpretation of conditional expression (5).

(2) Focusing

Focusing will be described. In the zoom lens according to the present invention, focusing from infinity to a close object is preferable to be performed by moving the second lens group along the optical axis. The lens diameter of the second lens group having negative refracting power is smaller than that of the first lens group having positive refracting power. So, employment of the second lens group as the focusing lens group achieves miniaturization of the focusing lens group. Moreover, employment of the second lens group having strong refracting power as the focusing lens group reduces movement in focusing. So, high-speed automatic focusing is achieved by employment of the second lens group as the focusing lens group.

1-3. Conditional Expression

Conditional expressions which should be satisfied or is preferable to be satisfied by the zoom lens according to the present invention will be described. The zoom lens according to the present invention is characterized in satisfying conditional expressions (1) to (3) described below, and it is preferable to satisfy conditional expressions (4) to (8) described later.

$$-1.30 < \beta rw < -0.80 \quad (1)$$

$$-0.21 < \beta 2w/\tan \theta w < -0.12 \quad (2)$$

$$0.55 < fp/\sqrt{(fw \times ft)} < 1.20 \quad (3)$$

where $\beta rw$: Synthetic lateral magnification at wide-angle end of lens group arranged closer to image plane side than the second lens group $\beta 2w$: Lateral magnification of the second lens group at wide-angle end $\theta w$: Half image viewing angle of most off-axis beam at wide-angle end $fp$: Focal length of the lens group P $fw$: Focal length of entire optical system at wide-angle end $ft$: Focal length of entire optical system at telephoto end 1-3-1. Conditional Expression (1)

Conditional expression (1) will be interpreted. Conditional expression (1) defines a synthetic lateral magnification at wide-angle end of all lens groups arranged closer to the image plane side than the second lens group in the zoom lens according to the present invention. By satisfying the conditional expression (1), a high magnification change ratio while maintaining high imaging performance is realized and achieve the downsizing of the zoom lens. Satisfaction of conditional expression (1) may secure a proper back focus demanded for an imaging apparatus such as a single lens reflex camera and a mirror-less single lens reflex camera, for example, and the zoom lens can be suitably used as an interchangeable lens for a lens-interchangeable imaging apparatus.

If the value of conditional expression (1) is equal to or exceeding the upper limit, the synthetic lateral magnification of lens groups behind the third lens group at wide-angle end is too small and application of the zoom lens to an interchangeable lens of a lens-interchangeable imaging apparatus is made difficult since an appropriate back focus is hardly secured. In contrast, if the value of conditional expression (1) is equal to or less than the lower limit value, the synthetic lateral magnification of the lens groups behind the third lens group increases, and the back focus is too long over an appropriate range. As a result, miniaturization in the total optical length direction at wide-angle end is made difficult. Moreover, reduction of the aberration amount in the first and the second lens groups is required to reduce the aberration amount of the entire optical system since the magnification change ratio in the lens groups behind the third lens group is large. So, the number of lenses constituting the first and the second lens groups should increase, and the matter makes downsizing and cost reduction in the zoom lens difficult. Note that, the synthetic lateral magnification at wide-angle end of lens groups arranged closer to the image plane side than the second lens group in conditional expression (1) described above refers to the synthetic lateral magnification at wide-angle end of the third to final lens groups.

Conditional expression (1) described above is more preferable to be in the range of following equation (1)' to ensure the effect described above.

$$-1.20<\beta rw<-0.85 \tag{1}'$$

1-3-2. Conditional Expression (2)

Conditional expression (2) defines the lateral magnification at wide-angle end of the second lens group against the image viewing angle at wide-angle end. Satisfaction of the conditional expression (2) makes the image viewing angle at wide-angle end wide and secures excellent image focusing performance. If the value is equal to or exceeding the upper limit value of conditional expression (2), the image viewing angle of the second lens group tends to expand too much. So, correction of image distortion at wide-angle end is made difficult. In contrast, if the value is equal to or less than the lower limit value of conditional expression (2), the image viewing angle of the second lens group tends to less expands to make expansion of the image viewing angle at wide-angle end difficult.

Conditional expression (2) described above is more preferable to be in the range of following equation (2)' to ensure the effect described above.

$$-0.206<\beta 2w/\tan \theta w<-0.128 \tag{2}'$$

1-3-3. Conditional Expression (3)

Conditional expression (3) defines the focal length of the lens group P. Satisfaction of the conditional expression (3) achieves the downsizing of the zoom lens while securing high imaging performance. If the value is equal to or exceeding the upper limit value of conditional expression (3), i.e. with too weak refracting power of the lens group P, total optical length at telephoto end is made long since movement of the lens group P in magnification change should be large and makes miniaturization of the zoom lens difficult. In contrast, if the value is equal to or less than conditional expression (3), i.e. with too strong refracting power of the lens group P, miniaturization of the optical system is made difficult since correction of off-axis coma aberration is made difficult and constitution of the lens group P with a small number of lenses is made impossible.

Conditional expression (3) described above is preferable to be in the range of following equation (3)', is more preferable to be in the range of following equation (3)", and is further preferable to be in the range of following equation (3)''' to ensure the effect described above.

$$0.58<fp/[\text{root of }(fw \times ft)]<1.05 \tag{3}'$$

$$0.60<fp/[\text{root of }(fw \times ft)]<0.90 \tag{3}''$$

$$0.60<fp/[\text{root of }(fw \times ft)]<0.80 \tag{3}'''$$

1-3-4. Conditional Expression (4)

Conditional expression (4) will be interpreted. The first lens group in the zoom lens according to the present invention is preferable to satisfy following conditional expression (4).

$$1.33<f1/\sqrt{(fw \times ft)}<2.20 \tag{4}$$

where
f1: Focal length of the first lens group

Conditional expression (4) defines the focal length of the first lens group. Satisfaction of the conditional expression (4) achieves the further downsizing of the zoom lens while securing high imaging performance. If the value is equal to or exceeding the upper limit value of conditional expression (4), i.e. with too weak refracting power of the first lens group, miniaturization of the zoom lens is made difficult since movement of the first lens group in magnification change should be large and the total optical length at telephoto end is made long. In contrast, if the value is equal to or less than the lower limit value of conditional expression (4), i.e. with too strong refracting power of the first lens group, miniaturization of the zoom lens is made difficult since on-axis chromatic aberration of magnification at telephoto end is made difficult and it makes constitution of the first lens group with a small number of lenses impossible.

Conditional expression (4) described above is preferable to be in the range of following equation (4)' to ensure the effect described above.

$$1.35<f1/[\text{root of }(fw \times ft)]<2.10 \tag{4}'$$

1-3-5. Conditional Expression (5)

Next, conditional expression (5) will be interpreted. The third lens group and the lens group P in the zoom lens according to the present invention are preferable to satisfy following conditional expression (5).

$$1.05<mp/m3<1.50 \tag{5}$$

where
mp: Movement of the lens group P in magnification change from wide-angle end to telephoto end
m3: Movement of third lens group in magnification change from wide-angle end to telephoto end Conditional expression (5) defines ratio between movement of the third lens group and movement of the lens group P in magnification change from the wide-angle end to the telephoto end. As described above, the lens group P is preferable to approach to the third lens group in magnification change from the wide-angle end to the telephoto end in the zoom lens according to the present invention. In the model, further downsizing of the zoom lens while securing high imaging performance can be achieved by movement of the third lens group and the lens group P which satisfies conditional expression (5).

If the value is equal to or exceeding the upper limit value of conditional expression (5), movement of the lens group P with respect to movement of the third lens group in magnification change from the wide-angle end to the telephoto end is made large over a proper range. If so, a gap between the third lens group and the lens group P at wide-angle end should increase, and miniaturization in the total optical length direction at wide-angle end is hardly achieved. Further, miniaturization in the radial direction of lenses constituting the lens group P is made difficult. In contrast, if the value is equal to or less than the lower limit value of conditional expression (5), movement of the lens group P is made smaller than movement of the third lens group in magnification change from the wide-angle end to the telephoto end. That is, the magnification change power of the lens group P is too small to make miniaturization in the total optical length direction at telephoto end difficult, and image distortion correction at the intermediate focal length is made difficult.

Conditional expression (5) described above is preferable to be in the range of following equation (5)' and is more preferable to be in the range of following equation (5)" to ensure the effect described above.

$$1.05<mp/m3<1.45 \tag{5}'$$

$$1.08<mp/m3<1.40 \tag{5}''$$

1-3-6. Conditional Expression (6)

Next, conditional expression (6) will be interpreted. The second lens in the zoom lens according to the present invention is preferable to satisfy following conditional expression (6).

$$0.23 < (\beta 2t/\beta 2w)/(ft/fw) < 0.50 \quad (6)$$

where $\beta 2t$: Lateral magnification at telephoto end of the second lens group Conditional expression (6) defines the contribution ratio of the second lens group on the magnification change ratio of the entire zoom lens. If the conditional expression (6) is satisfied, the magnification change ratio of the zoom lens can be increased without increasing the number of lenses constituting the second lens group. If the value is equal to or exceeding the upper limit value of conditional expression (6), the number of lenses constituting the second lens group should increase to reduce the aberration generation amount in magnification change since the ratio of the second lens group contributing to the magnification change ratio is too large. So, miniaturization and cost reduction in the zoom lens is made difficult. In contrast, if the value is equal to or less than the lower limit value of conditional expression (6), increase of the magnification change ratio of the zoom lens is made difficult since the ratio of the second lens group contributing to the magnification change ratio is too small.

Conditional expression (6) is preferable to be in the range of following equation (6)', and is more preferable to be in the range of following equation (6)'' to ensure the effect described above.

$$0.25 < (\beta 2t/(\beta 2w)/(ft/fw) < 0.46 \quad (6)'$$

$$0.26 < (\beta 2t/(\beta 2w)/(ft/fw) < 0.42 \quad (6)''$$

1-3-7. Conditional Expression (7)

Conditional expression (7) will be interpreted. The second lens group in the zoom lens according to the present invention is preferable to satisfy following conditional expression (7).

$$-0.30 < f2/\sqrt{(fw \times ft)} < -0.16 \quad (7)$$

where f2: Focal length of the second lens group

Conditional expression (7) defines the focal length of the second lens group. Satisfaction of the conditional expression (7) achieves further downsizing of the zoom lens while securing high imaging performance. If the value is equal to or exceeding the upper limit value of conditional expression (7), i.e. with too strong refracting power of the second lens, correction of both image distortion at wide-angle end and spherical aberration deviation caused by the magnification change is made difficult. Moreover, as these aberration correction should be corrected to achieve an optical system of high optical performance, increased number of lenses makes miniaturization of the zoom lens difficult. In contrast, if the value is equal to or less than the lower limit value of conditional expression (7), i.e. with the too weak refracting power of the second lens group, miniaturization of the total length direction at telephoto end is made difficult since movement of the second lens group in magnification change increases and it makes increase of the magnification change ratio difficult.

Conditional expression (7) is preferable to be in the range of following equation (7)' to ensure the effect described above.

$$-0.26 < f2/[\text{root of } (fw \times ft)] < -0.16 \quad (7)'$$

1-3-8. Conditional Expression (8)

Conditional expression (8) will be interpreted. In the zoom lens according to the present invention, the second lens group is preferable not only to move along the optical axis in focusing from infinity to a close object but also to satisfy following conditional expression (8).

$$-0.99 < \beta 2t < -0.50 \quad (8)$$

where $\beta 2t$: Lateral magnification at telephoto end of the second lens group Conditional expression (8) defines the lateral magnification at telephoto end of the second lens group. Not only employment as a focusing lens group but also satisfaction of the conditional expression (8) make movement of the second lens group in focusing less.

Hereinafter, Examples and Comparative Examples will be described to specifically demonstrate the present invention. However, the present invention is not limited to Examples described later since the lens arrangement described in Examples merely exemplifies the present invention, and it is natural that the lens arrangement of the zoom lens according to the present invention can be arbitrarily arranged without departing from the scope of the present invention.

Example 1

(1) Lens Arrangement of Zoom Lens

FIG. 1 shows a lens arrangement of the zoom lens in Example 1. As shown in FIG. 1, the zoom lens in Example 1 is constituted by the first lens group G1 having positive refracting power, the second lens group G2 having negative refracting power, the third lens group G3 having positive refracting power and the fourth lens group G4 as the lens group P having positive refracting power in order from the object side. Specific lens arrangement is shown in FIG. 1. In the zoom lens, the second lens group G2 is a focusing lens group, and focusing from infinity to a close object is performed by moving second lens group G2 along the optical axis. The third lens group G3 includes a front group having positive refracting power and a rear group having negative refracting power; and the rear group is a vibration compensation lens group which moves in the direction perpendicular to the optical axis, and the vibration compensation lens group corrects image movement caused by hand shake or the like. Movement of each lens group in magnification change from the wide-angle end to the telephoto end is shown by arrows in FIG. 1, and the fourth lens group G4 approaches to the third lens group G3.

(2) Optical Data

Optical data in Example 1 will be shown below. Hereinafter, the unit for focal length and paraxial image height is (mm), and the unit for half image viewing angle is(°).

Focal length (f): 14.40-71.00-194.00
F number (Fno): 3.45-6.15-6.5
Half image viewing angle ($\omega$): 46.0-11.21-4.23
Paraxial image height: 14.91-14.07-14.34

The zoom lens in Example 1 is a wide-angle high-magnification change-ratio zoom lens in which the image viewing angle at wide-angle end is 92.0° and the magnification change ratio is 13.47.

(3) Lens Data

The lens data of the zoom lens in Example 1 is shown in Table 1. The items in the lens data shown in Table 1 are as follows. "NS" denotes the lens surface number in order from the object side. "R" denotes the curvature radius (mm) of the lens surface, "D" denotes a gap (mm) between adjacent lens surfaces along the optical axis, "Nd" denotes the refractive index on a d-line (wavelength λ=587.6 nm), and "ABV" denotes the Abbe number on a d-line (wavelength λ=587.6 nm). "STOP" attached after the surface number denotes a stop, and a surface with "ASPH" attached after the surface number denotes an aspheric surface. If the lens surface is aspheric, a paraxial curvature radius is shown in the column of curvature radius "R". These are the same in tables shown later.

$$z = \frac{y^2}{R(1 + \sqrt{1 - (1+K)y/R^2})^2} + Ay^4 + By^6 + Cy^8 + Dy^{10} \ldots$$

where
z: Aspheric depth
y: Height
R: Paraxial curvature radius
K, A, B, C, D . . . : Aspheric surface coefficient

TABLE 2

| ASPH | K<br>8(D) | 2(A)<br>10(E) | 4(B)<br>12(F) | 6(C) |
|---|---|---|---|---|
| 6 | 0.0000<br>3.42078e-010 | 0.00000e+000<br>-5.39212e-014 | 3.18160e-005<br>-1.01961e-015 | -1.76987e-007 |
| 13 | 0.0000<br>9.32473e-010 | 0.00000e+000<br>-2.36806e-011 | 8.41943e-006<br>9.32023e-014 | 2.98392e-007 |
| 14 | 0.0000<br>5.55803e-010 | 0.00000e+000<br>-2.02938e-011 | -2.08672e-005<br>-7.77764e-015 | 1.52747e-007 |
| 23 | 0.000<br>2.82975e-009 | 0.00000e+000<br>-1.74215e-011 | 1.20646e-005<br>0.00000e+000 | -1.69956e-007 |
| 26 | 0.0000<br>-9.17344e-010 | 0.00000e+000<br>-7.05209e-012 | -3.95937e-005<br>0.00000e+000 | 2.00334e-007 |
| 27 | -8.6805<br>2.34846e-010 | 0.00000e+000<br>-1.38933e-011 | -3.10292e-005<br>0.00000e+000 | 1.96369e-007 |

TABLE 1

| NS | R | D | Nd | ABV |
|---|---|---|---|---|
| 1 | 105.7205 | 0.7000 | 1.90366 | 31.31 |
| 2 | 60.5142 | 7.0000 | 1.49700 | 81.61 |
| 3 | 2706.3170 | 0.1500 | | |
| 4 | 59.8759 | 5.3000 | 1.61800 | 63.39 |
| 5 | 250.0497 | D(5) | | |
| 6 ASPH | 300.0000 | 0.1500 | 1.51460 | 49.96 |
| 7 | 157.6994 | 0.8000 | 1.88300 | 40.80 |
| 8 | 11.9812 | 5.5045 | | |
| 9 | 153.2004 | 0.8000 | 1.77250 | 49.62 |
| 10 | 31.2058 | 0.4350 | | |
| 11 | 40.0484 | 4.7766 | 1.84666 | 23.78 |
| 12 | -27.5544 | 0.3521 | | |
| 13 ASPH | -21.0907 | 0.7000 | 1.76802 | 49.24 |
| 14 ASPH | -930.4098 | D(14) | | |
| 15 STOP | 0.0000 | 1.0000 | | |
| 16 | 40.0000 | 2.0000 | 1.72916 | 54.67 |
| 17 | 80.0000 | 0.1500 | | |
| 18 | 26.3011 | 2.9136 | 1.48749 | 70.44 |
| 19 | -64.6503 | 2.3163 | | |
| 20 | 35.6878 | 3.0825 | 1.49700 | 81.61 |
| 21 | -29.1830 | 0.8000 | 1.90366 | 31.31 |
| 22 | 1970.7847 | 1.7636 | | |
| 23 ASPH | -43.4498 | 0.8000 | 1.85135 | 40.10 |
| 24 | 23.5910 | 2.3883 | 1.80809 | 22.76 |
| 25 | 208.9693 | D(25) | | |
| 26 ASPH | 22.9720 | 4.4356 | 1.58313 | 59.46 |
| 27 ASPH | -28.0929 | 0.1500 | | |
| 28 | -88.3434 | 0.8000 | 1.90366 | 31.31 |
| 29 | 29.4336 | 2.7923 | | |
| 30 | 193.0249 | 2.7317 | 1.69680 | 55.46 |
| 31 | -36.1889 | D(31) | | |

Regarding the aspheric surface shown in Table 1, an aspheric surface coefficient if the shape is expressed by following equation z is shown in Table 2.

Lens gap change at wide-angle end (f=14.40), intermediate focal length (f=71.00) and telephoto end (f=194.00) of the zoom lens in Example 1 is shown in Table 3.

TABLE 3

| Focal Length | 14.40 | 71.00 | 194.00 |
|---|---|---|---|
| D(5) | 1.0722 | 32.3183 | 65.0002 |
| D(14) | 31.1863 | 6.9872 | 1.5000 |
| D(25) | 6.6163 | 1.7712 | 0.9000 |
| D(31) | 37.8893 | 92.3603 | 95.3648 |

(4) Conditional Expression

Figure 2:
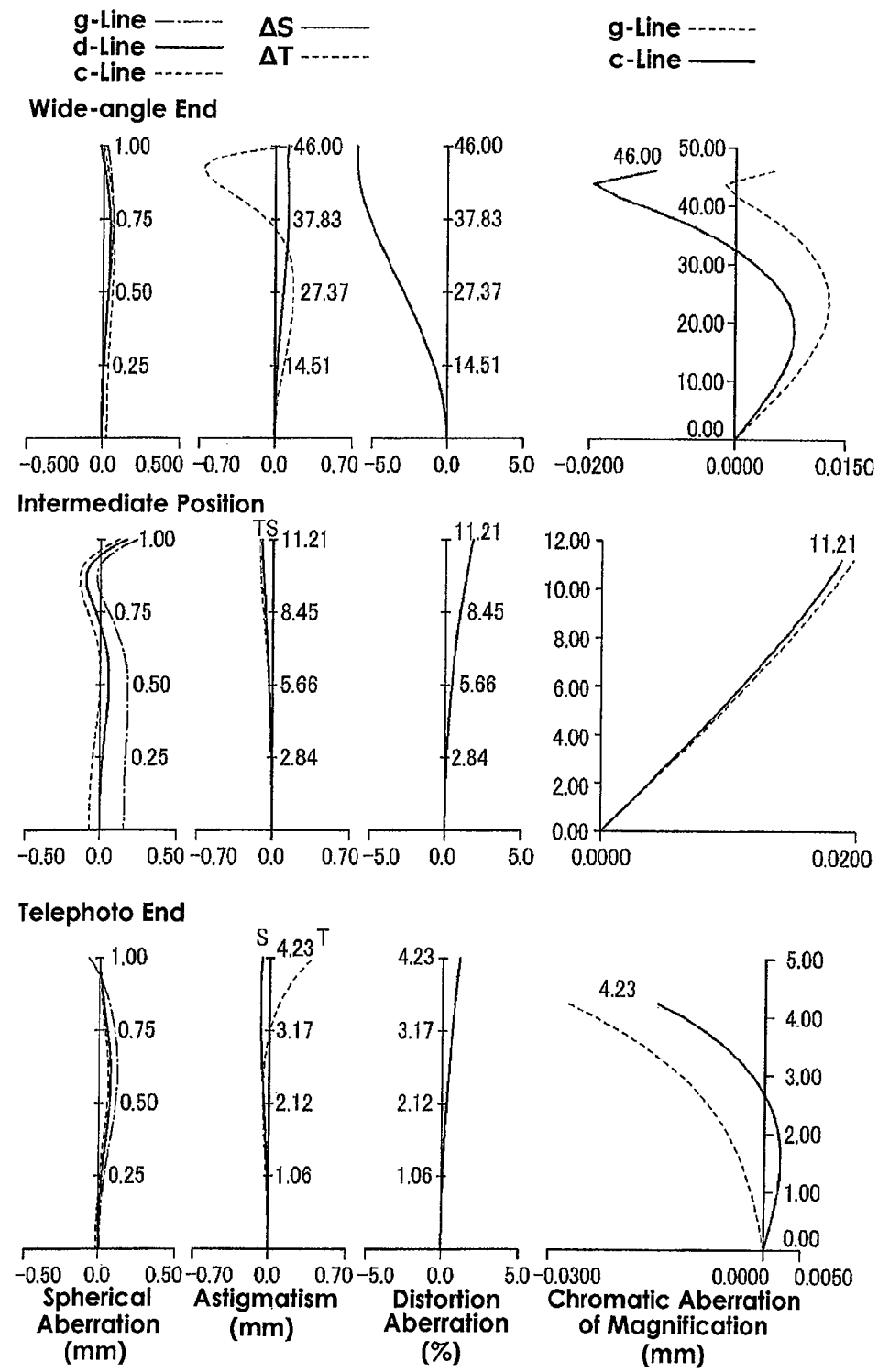
FIG. 2 is a spherical aberration diagram, astigmatism diagram, distortion aberration diagram and chromatic aberration of magnification diagram in infinity focusing at a wide-angle end, intermediate position and telephoto end of the zoom lens according to the present invention in Example 1. In the diagram, a solid line in the spherical aberration diagram denotes a d-line at a wavelength of 587.56 nm, a dotted line denotes a c-line at a wavelength of 656.28 nm, and a dashed line denotes a g-line at a wavelength of 435.84 nm. Further, solid line graph ΔS in the astigmatism diagram denotes the aberration on a sagittal image plane, and dotted line ΔT denotes the aberration on a tangential (meridional) image plane; a solid line in the chromatic aberration of magnification diagram denotes a c-line at a wavelength of 656.28 nm and a dotted line denotes a g-line at a wavelength of 435.84 nm; and the same applies to aberration diagrams herein after.

The values of conditional expressions (1) to (8) in Example 1 are shown in Table 37. So, the zoom lens in Example 1 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 2.

Example 2

(1) Lens Arrangement of Zoom Lens

Figure 3:
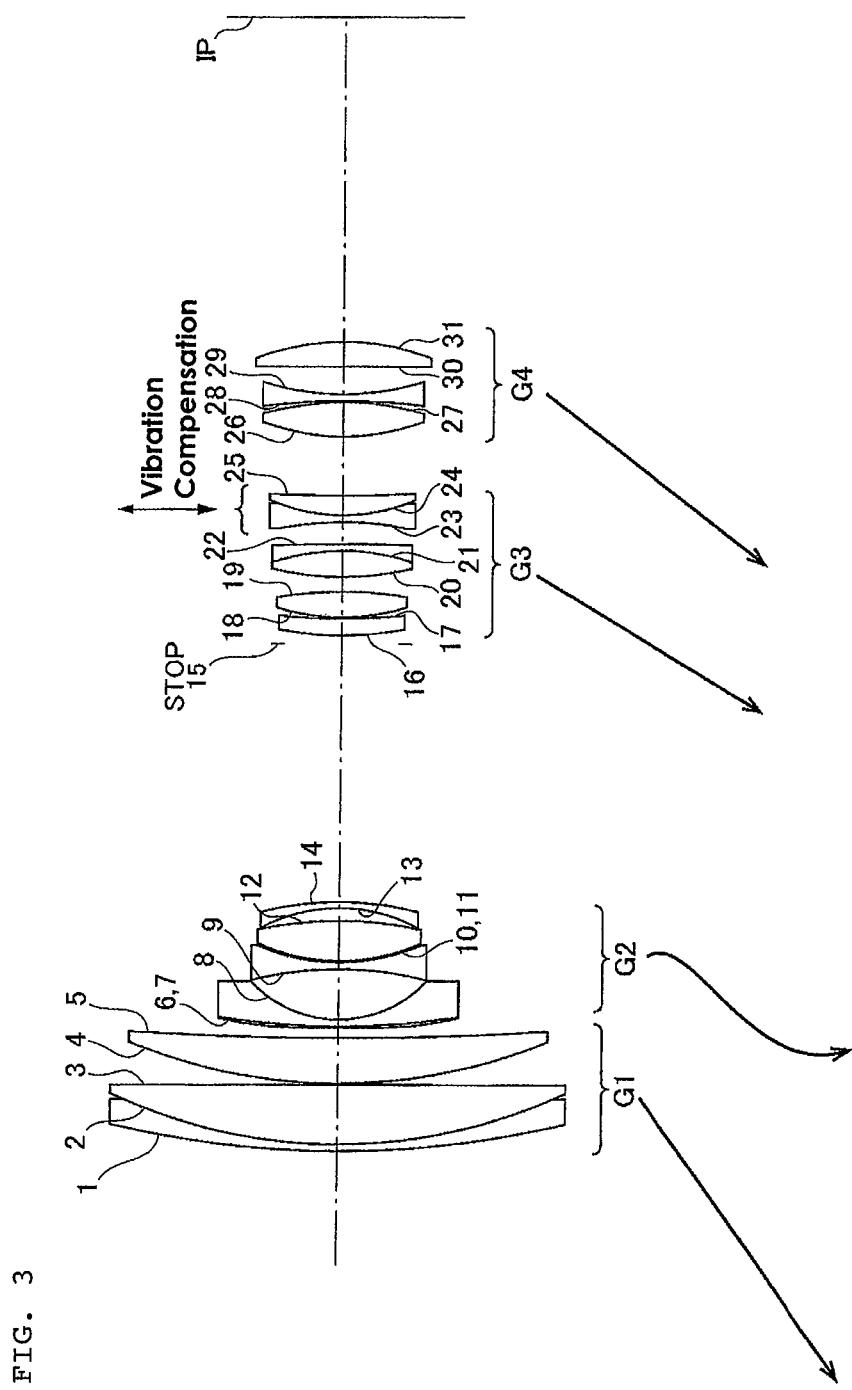
FIG. 3 is a cross-sectional view of optical system illustrating a lens cross section in infinity focusing at wide-angle end and movement of each lens group in zooming of the zoom lens according to the present invention in Example 2.

FIG. 3 shows a lens arrangement of the zoom lens in Example 2. As shown in FIG. 3, the zoom lens in Example 2 is constituted by the first lens group G1 having positive refracting power, the second lens group G2 having negative refracting power, the third lens group G3 having positive refracting power and the fourth lens group G4 as the lens group P having positive refracting power in order from the object side. Specific lens arrangement is shown in FIG. 3. The second lens group G2 is a focusing lens group, and the second lens group G2 moves along the optical axis in f focusing from infinity to a close object the same as in Example 1. The rear group of the third lens group G3 is a vibration compensation lens group. Movement of each lens group in magnification change is shown in FIG. 3.

(2) Optical Data

Optical data in Example 2 is shown below.
Focal length (f): 15.40-71.00-194.00
F number (Fno): 3.6-6.29-6.5
Half image viewing angle (ω): 44.33-11.09-4.12

Paraxial image height: 15.04-13.91-13.97

The zoom lens in Example 2 is a wide-angle high-magnification change-ratio zoom lens in which the image viewing angle at wide-angle end is 88.66° and the magnification change ratio is 12.60.

(3) Lens Data

Lens data of the zoom lens in Example 2 is shown in Table 4. Table 5 shows the aspheric surface coefficient of each aspheric surface. Lens gap change at wide-angle end (f=15.40), intermediate focal length (f=71.00) and telephoto end (f=194.00) of the zoom lens in Example 2 is shown in Table 6.

TABLE 4

| NS | R | D | Nd | ABV |
|---|---|---|---|---|
| 1 | 117.7446 | 0.8000 | 1.90366 | 31.31 |
| 2 | 64.8912 | 7.0000 | 1.49700 | 81.61 |
| 3 | −5120.3593 | 0.1500 | | |
| 4 | 67.3295 | 5.3000 | 1.61800 | 63.39 |
| 5 | 401.3084 | D(5) | | |
| 6 ASPH | 245.6302 | 0.2000 | 1.51460 | 49.96 |
| 7 | 93.3591 | 0.8000 | 1.88300 | 40.80 |
| 8 | 14.6020 | 5.8939 | | |
| 9 | −43.8804 | 0.8000 | 1.77250 | 49.62 |
| 10 | 24.9088 | 0.1500 | | |
| 11 | 23.9581 | 4.6927 | 1.84666 | 23.78 |
| 12 | −47.9165 | 1.5040 | | |
| 13 | −20.0762 | 0.7000 | 1.77250 | 49.62 |
| 14 | −38.6202 | D(14) | | |
| 15 STOP | 0.0000 | 1.0000 | | |
| 16 | 40.0000 | 2.0000 | 1.72916 | 54.67 |
| 17 | 80.0000 | 0.1500 | | |
| 18 | 26.8963 | 2.9932 | 1.48749 | 70.44 |
| 19 | −47.4086 | 1.7496 | | |
| 20 | 36.3532 | 3.0352 | 1.49700 | 81.61 |
| 21 | −27.4979 | 0.8000 | 1.90366 | 31.31 |
| 22 | −282.9835 | 2.5901 | | |
| 23 ASPH | −37.7384 | 0.8000 | 1.85135 | 40.10 |
| 24 | 22.1309 | 2.3124 | 1.80809 | 22.76 |
| 25 | 173.3771 | D(25) | | |
| 26 ASPH | 24.3956 | 4.0601 | 1.58313 | 59.46 |

TABLE 4-continued

| NS | R | D | Nd | ABV |
|---|---|---|---|---|
| 27 ASPH | −32.6493 | 0.1500 | | |
| 28 | −79.5351 | 0.8000 | 1.90366 | 31.31 |
| 29 | 32.4392 | 3.2423 | | |
| 30 | −7040.9476 | 2.9070 | 1.69680 | 55.46 |
| 31 | −29.3962 | D(31) | | |

TABLE 5

| ASPH | K<br>8(D) | 2(A)<br>10(E) | 4(B)<br>12(F) | 6(C) |
|---|---|---|---|---|
| 6 | 0.0000<br>5.69892e−010 | 0.00000e+000<br>−1.56334e−012 | 2.86246e−005<br>1.87538e−015 | −1.18223e−007 |
| 23 | 0.0000<br>1.90260e−009 | 0.00000e+000<br>−1.19025e−011 | 1.18519e−005<br>0.00000e+000 | −1.04255e−007 |
| 26 | 0.0000<br>−1.36102e−009 | 0.00000e+000<br>−3.15575e−012 | −3.25700e−005<br>0.00000e+000 | 1.83336e−007 |
| 27 | −12.4362<br>−7.77270e−010 | 0.00000e+000<br>−7.85015e−012 | −2.59170e−005<br>0.00000e+000 | 2.32001e−007 |

TABLE 6

| Focal Length | 15.4000 | 71.0002 | 194.0007 |
|---|---|---|---|
| D(5) | 1.1509 | 34.4004 | 68.0454 |
| D(14) | 30.3235 | 7.2443 | 1.5000 |
| D(25) | 6.9373 | 1.7231 | 0.9000 |
| D(31) | 37.9717 | 89.0037 | 91.8558 |

(4) Conditional Expression

Figure 4:
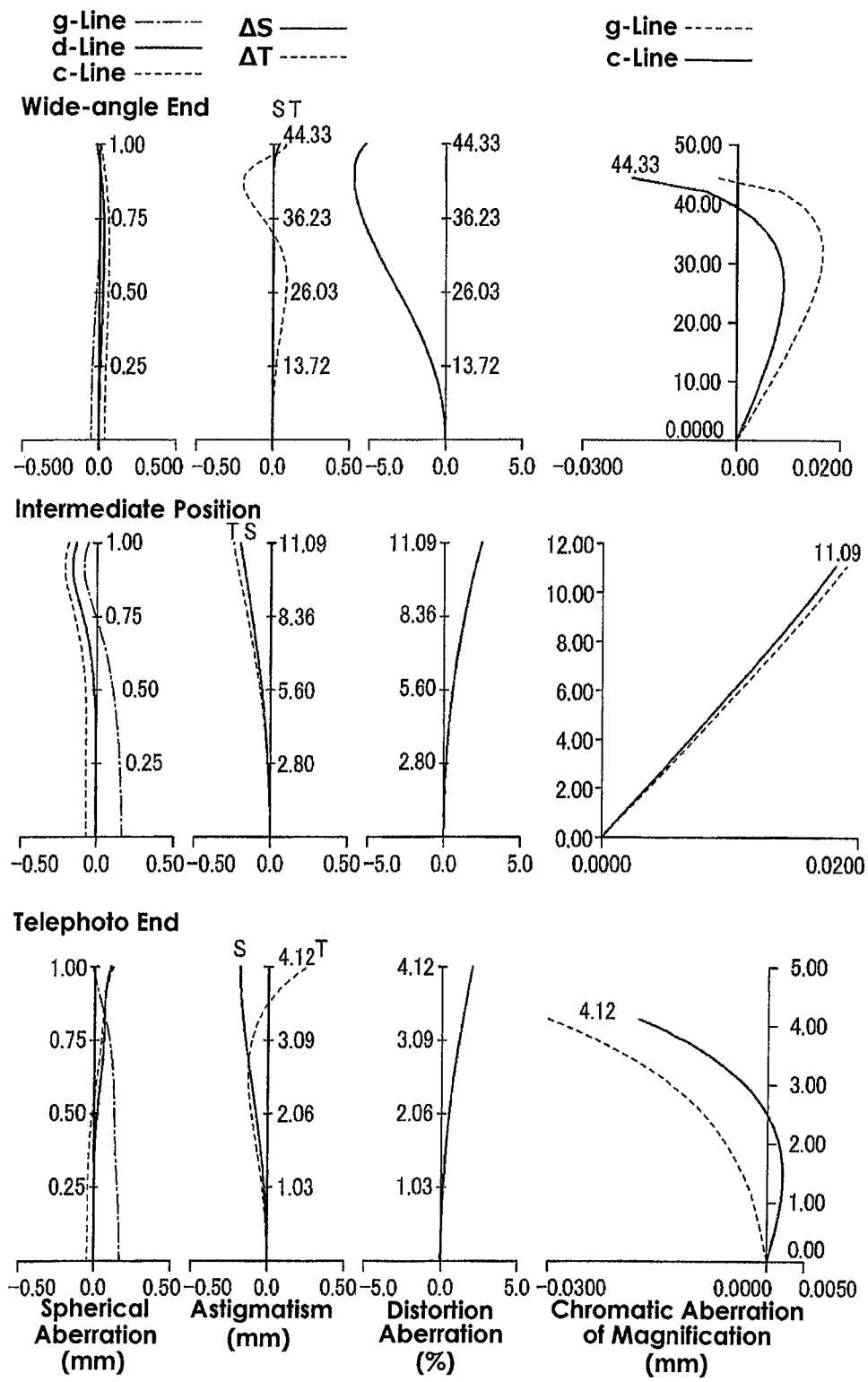
FIG. 4 is a spherical aberration diagram, astigmatism diagram, distortion aberration diagram and chromatic aberration of magnification diagram in infinity focusing at a wide-angle end, intermediate position and telephoto end of the zoom lens according to the present invention in 2.

The values of conditional expressions (1) to (8) in Example 3 are shown in Table 37. So, the zoom lens in Example 2 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 4.

Example 3

(1) Lens Arrangement of Zoom Lens

Figure 5:
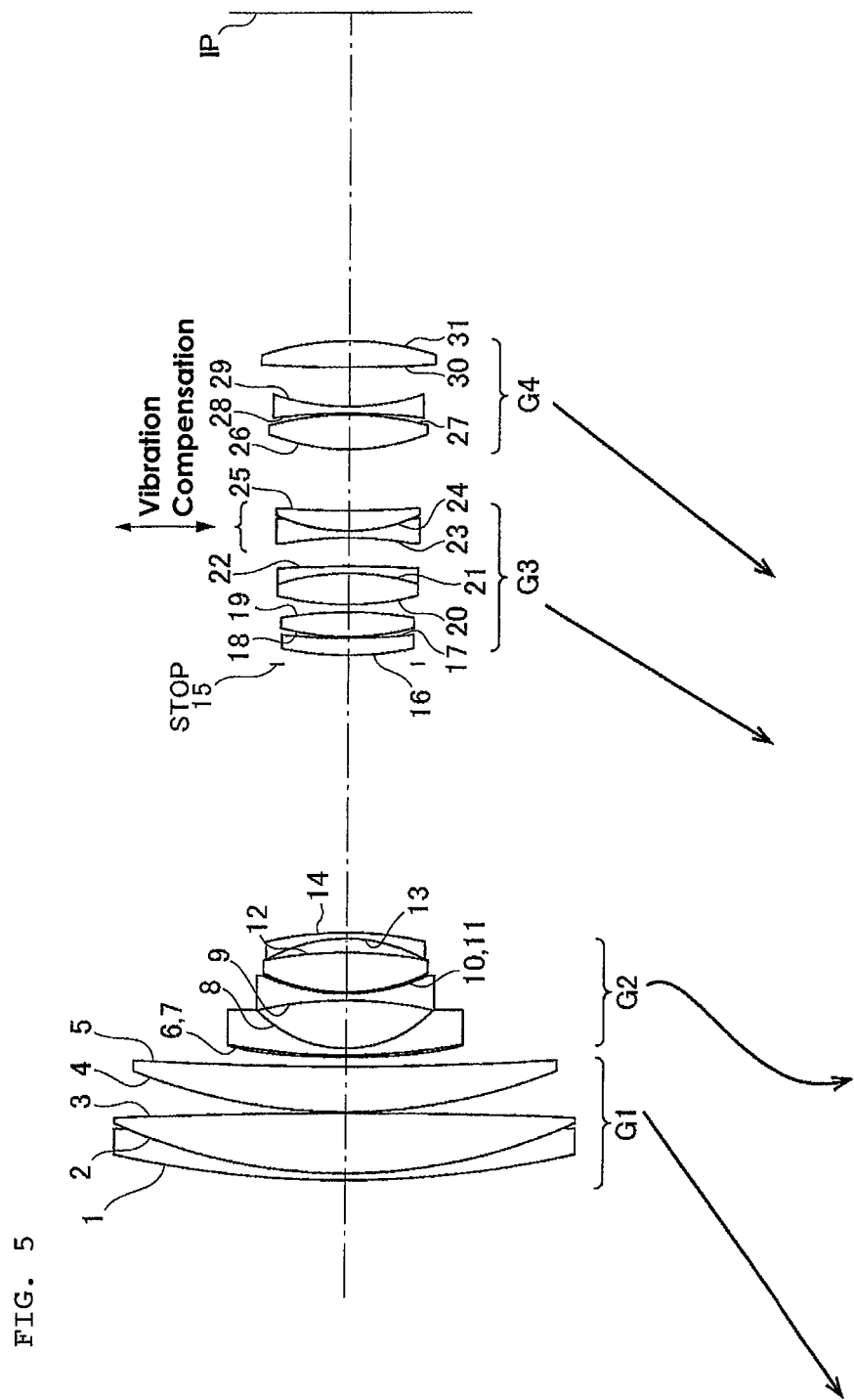
FIG. 5 is a cross-sectional view of optical system illustrating a lens cross section in infinity focusing at wide-angle end and movement of each lens group in zooming of the zoom lens according to the present invention in Example 3.

FIG. 5 shows a lens arrangement of the zoom lens in Example 3. As shown in FIG. 5, the zoom lens in Example 3 is constituted by the first lens group G1 having positive refracting power, the second lens group G2 having negative refracting power, the third lens group G3 having positive refracting power and the fourth lens group G4 as the lens group P having positive refracting power in order from the object side. Specific lens arrangement is shown in FIG. 5. The second lens group G2 is a focusing lens group, and the second lens group G2 moves along the optical axis in focusing from infinity to a close object the same as in Example 1. The rear group of the third lens group G3 is a vibration compensation lens group. Movement of each lens group in magnification change is shown in FIG. 5.

(2) Optical Data

Optical data in Example 3 is shown below.
Focal length (f): 16.40-71.00-215.00
F number (Fno): 3.6-6.2-6.5
Half image viewing angle (ω): 42.96-11.21-3.77
Paraxial image height: 15.27-14.07-14.18

The zoom lens in Example 3 is a wide-angle high-magnification change-ratio zoom lens in which the image viewing angle at wide-angle end is 85.92° and the magnification change ratio is 13.11.

(3) Lens Data

The lens data of the zoom lens in Example 3 is shown in Table 7. The aspheric surface coefficient of each aspheric surface is shown in Table 8. Lens gap change at wide-angle end (f=16.40), intermediate focal length (f=71.00) and telephoto end (f=215.00) of the zoom lens in Example 3 is shown in Table 9.

TABLE 7

| NS | R | D | Nd | ABV |
|---|---|---|---|---|
| 1 | 125.9315 | 0.8000 | 1.90366 | 31.31 |
| 2 | 66.8661 | 7.0000 | 1.49700 | 81.61 |
| 3 | −741.8476 | 0.1500 | | |
| 4 | 68.4367 | 5.3000 | 1.61800 | 63.39 |
| 5 | 426.8848 | (D5) | | |
| 6 ASPH | 142.3738 | 0.2000 | 1.51460 | 49.96 |
| 7 | 81.2972 | 0.8000 | | |
| 8 | 14.8880 | 5.5100 | | |
| 9 | −49.7161 | 0.8000 | 1.77250 | 49.62 |
| 10 | 24.2284 | 0.1500 | | |
| 11 | 22.9056 | 4.6292 | 1.84666 | 23.78 |
| 12 | −52.7952 | 1.6069 | | |
| 13 | −19.6625 | 0.7000 | 1.77250 | 49.62 |
| 14 | −42.8470 | D(14) | | |
| 15 STOP | 0.0000 | 1.0000 | | |
| 16 | 40.0000 | 2.0000 | 1.72916 | 54.67 |
| 17 | 80.0000 | 0.1500 | | |
| 18 | 31.0201 | 2.8970 | 1.48749 | 70.44 |
| 19 | −48.8178 | 0.8886 | | |
| 20 | 34.9867 | 3.6144 | 1.49700 | 81.61 |
| 21 | −28.6679 | 0.8032 | 1.90366 | 31.31 |
| 22 | −137.9573 | 3.3118 | | |
| 23 ASPH | −42.7396 | 0.8000 | 1.85135 | 40.10 |
| 24 | 20.8955 | 2.3516 | 1.80809 | 22.76 |
| 25 | 111.7996 | D(25) | | |
| 26 ASPH | 23.8205 | 4.0726 | 1.58313 | 59.46 |
| 27 ASPH | −33.2216 | 0.1500 | | |
| 28 | −74.8647 | 0.8000 | 1.90366 | 31.31 |
| 29 | 29.2261 | 4.5850 | | |
| 30 | 184.5200 | 3.0644 | 1.69680 | 55.46 |
| 31 | −33.9919 | D(31) | | |

TABLE 8

| ASPH | K<br>8(D) | 2(A)<br>10(E) | 4(B)<br>12(F) | 6(C) |
|---|---|---|---|---|
| 6 | 0.0000 | 0.00000e+000 | 2.43173e−005 | −1.35336e−007 |
| | 9.66664e−010 | −3.82472e−012 | 6.63648e−015 | |
| 23 | 0.0000 | 0.00000e+000 | 1.04920e−005 | −8.16301e−008 |
| | 1.49687e−009 | −9.03105e−012 | 0.00000e+000 | |
| 26 | 0.0000 | 0.00000e+000 | −2.60762e−005 | 1.08439e−007 |
| | 2.58741e−010 | −1.47682e−011 | 0.00000e+000 | |
| 27 | −13.8444 | 0.00000e+000 | −2.78100e−005 | 2.08567e−007 |
| | 4.45805e−010 | −1.81158e−011 | 0.00000e+000 | |

TABLE 9

| Focal Length | 16.4000 | 71.0002 | 215.0006 |
|---|---|---|---|
| D(5) | 1.1336 | 31.2931 | 67.2720 |
| D(14) | 31.2797 | 8.4215 | 1.5000 |
| D(25) | 7.1296 | 1.7245 | 0.9000 |
| D(31) | 38.0080 | 90.9192 | 93.7605 |

(4) Conditional Expression

Figure 6:
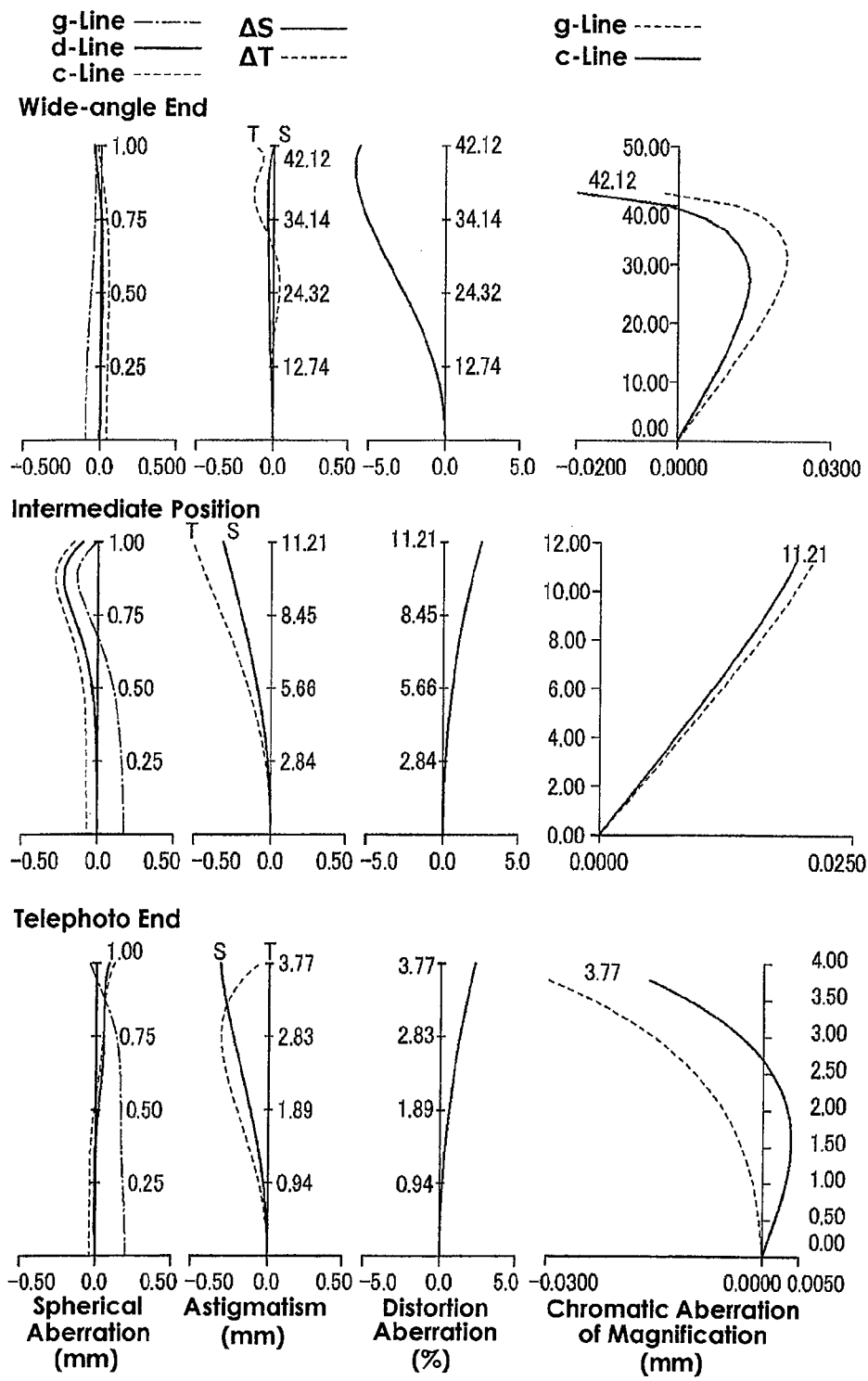
FIG. 6 is a spherical aberration diagram, astigmatism diagram, distortion aberration diagram and chromatic aberration of magnification diagram in infinity focusing at a wide-angle end, intermediate position and telephoto end of the zoom lens according to the present invention in 3.

The values of conditional expressions (1) to (8) in Example 3 are shown in Table 37. So, the zoom lens in Example 3 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 6.

Example 4

(1) Lens Arrangement of Zoom Lens

Figure 7:
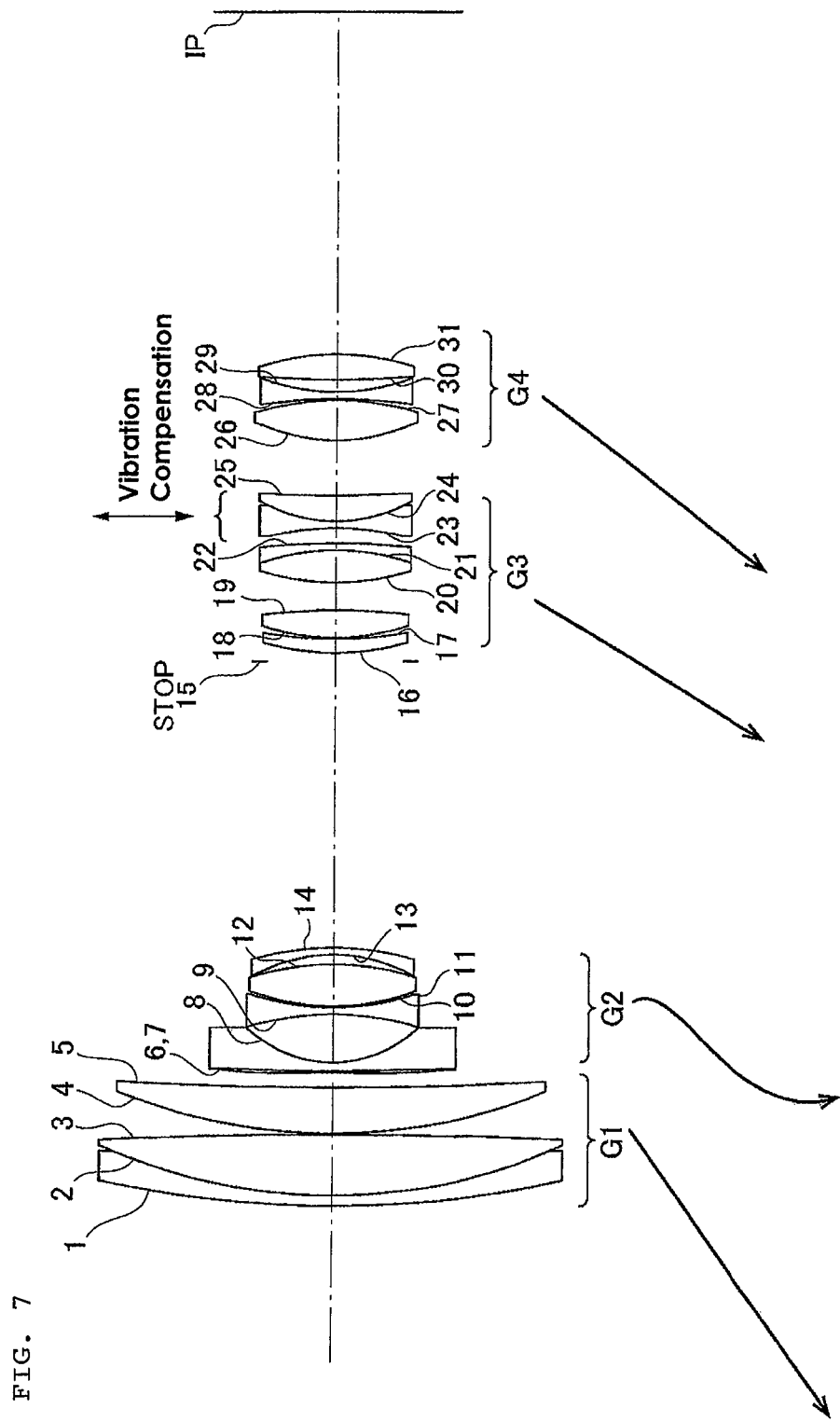
FIG. 7 is a cross-sectional view of optical system illustrating a lens cross section in infinity focusing at wide-angle end and movement of each lens group in zooming of the zoom lens according to the present invention in Example 4.

FIG. 7 shows a lens arrangement of the zoom lens in Example 4. As shown in FIG. 7, the zoom lens in Example 4 is constituted by the first lens group G1 having positive refracting power, the second lens group G2 having negative refracting power, the third lens group G3 having positive refracting power and the fourth lens group G4 as the lens group P having positive refracting power in order from the object side. Specific lens arrangement is shown in FIG. 7. The second lens group G2 is a focusing lens group, and the second lens group G2 moves along the optical axis in focusing from infinity to a close object the same as in Example 1. The rear group of the third lens group G3 is a vibration compensation lens group. Movement of each lens group in magnification change is shown in FIG. 7.

(2) Optical Data

Optical data in Example 4 is shown below.
Focal length (f): 16.40-71.00-244.98
F number (Fno): 3.46-6.16-6.5
Half image viewing angle (ω): 43.08-11.21-3.31
Paraxial image height: 15.34-14.07-14.16

The zoom lens in Example 4 is a wide-angle high-magnification change-ratio zoom lens in which the image viewing angle at wide-angle end is 86.16° and the magnification change ratio is 14.94.

(3) Lens Data

The lens data of the zoom lens in Example 4 is shown in Table 10. The aspheric surface coefficient of each aspheric surface is shown in Table 11. Lens gap change at wide-angle end (f=16.40), intermediate focal length (f=71.00) and telephoto end (f=244.98) of the zoom lens in Example 4 is shown in Table 12.

TABLE 10

| NS | R | D | Nd | ABV |
|---|---|---|---|---|
| 1 | 126.3110 | 1.2000 | 1.90366 | 31.31 |
| 2 | 66.3097 | 7.0000 | 1.49700 | 81.61 |
| 3 | −659.7972 | 0.1500 | | |
| 4 | 67.4385 | 5.3000 | 1.61800 | 63.39 |
| 5 | 447.5693 | D(5) | | |
| 6 ASPH | −259.1585 | 0.2000 | 1.51460 | 49.96 |
| 7 | 277.0953 | 1.0000 | 1.88300 | 40.80 |
| 8 | 14.8907 | 5.4982 | | |
| 9 | −35.8726 | 0.8000 | 1.78704 | 48.09 |
| 10 | 31.4202 | 0.1500 | | |
| 11 | 28.1506 | 4.7863 | 1.84666 | 23.78 |
| 12 | −32.8532 | 1.1046 | | |
| 13 ASPH | −19.7032 | 0.8000 | 1.88300 | 40.80 |
| 14 ASPH | −34.8171 | D(14) | | |
| 15 STOP | 0.0000 | 1.0000 | | |
| 16 | 31.6684 | 1.5903 | 1.61800 | 63.39 |
| 17 | 51.5856 | 0.1500 | | |
| 18 | 28.0455 | 3.1554 | 1.49700 | 81.61 |
| 19 | −74.6158 | 3.1982 | | |
| 20 | 31.0860 | 3.6984 | 1.48749 | 70.44 |
| 21 | −28.0424 | 0.8000 | 1.84666 | 23.78 |
| 22 | −84.5254 | 1.7571 | | |
| 23 ASPH | −32.8218 | 0.8000 | 1.85135 | 40.10 |
| 24 | 18.5897 | 2.9753 | 1.80809 | 22.76 |
| 25 | 134.7589 | D(25) | | |
| 26 ASPH | 20.7277 | 4.6478 | 1.58313 | 59.46 |
| 27 ASPH | −30.3950 | 0.1500 | | |
| 28 | −62.2198 | 0.8000 | 1.90366 | 31.31 |
| 29 | 26.4590 | 1.4040 | | |
| 30 | 119.5294 | 2.9393 | 1.56825 | 38.85 |
| 31 | −30.1322 | D(31) | | |

TABLE 11

| ASPH | K<br>8(D) | 2(A)<br>10(E) | 4(B)<br>12(F) | 6(C) |
|---|---|---|---|---|
| 6 | 0.0000<br>6.20261e−010 | 0.00000e+000<br>−1.96160e−012 | 3.52126e−005<br>3.02577e−015 | −1.32594e−007 |
| 23 | 0.0000<br>2.48530e−009 | 0.00000e+000<br>−1.48391e−011 | 1.69594e−005<br>0.00000e+000 | 1.37150e−007 |
| 26 | 0.0000<br>7.31460e−010 | 0.00000e+000<br>−2.06353e−011 | −3.05867e−005<br>0.00000e+000 | 8.50047e−008 |
| 27 | −12.4941<br>3.75430e−010 | 0.00000e+000<br>−2.05934e−011 | −2.66480e−005<br>0.00000e+000 | 2.12284e−007 |

TABLE 12

| Focal Length | 16.4000 | 70.9959 | 244.9763 |
|---|---|---|---|
| D(5) | 1.6842 | 31.3330 | 68.2355 |
| D(14) | 32.9489 | 10.2202 | 1.5000 |
| D(25) | 6.3512 | 1.6859 | 0.9000 |
| D(31) | 39.0341 | 90.4234 | 95.3290 |

(4) Conditional Expression

Figure 8:
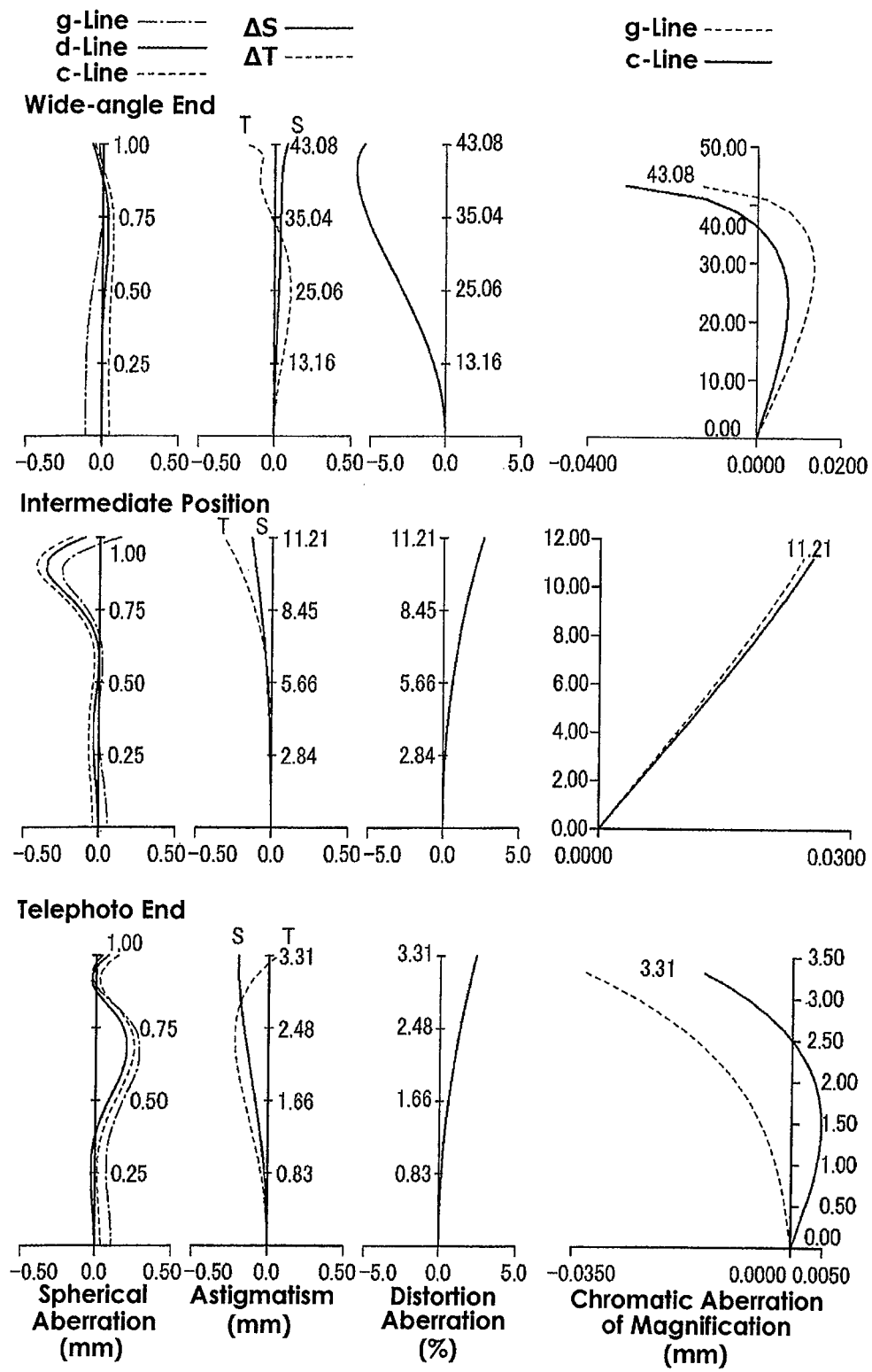
FIG. 8 is a spherical aberration diagram, astigmatism diagram, distortion aberration diagram and chromatic aberration of magnification diagram in infinity focusing at a wide-angle end, intermediate position and telephoto end of the zoom lens according to the present invention in 4.

The values of conditional expressions (1) to (8) in Example 4 are shown in Table 37. So, the zoom lens in Example 4 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 8.

Example 5

(1) Lens Arrangement of Zoom Lens

Figure 9:
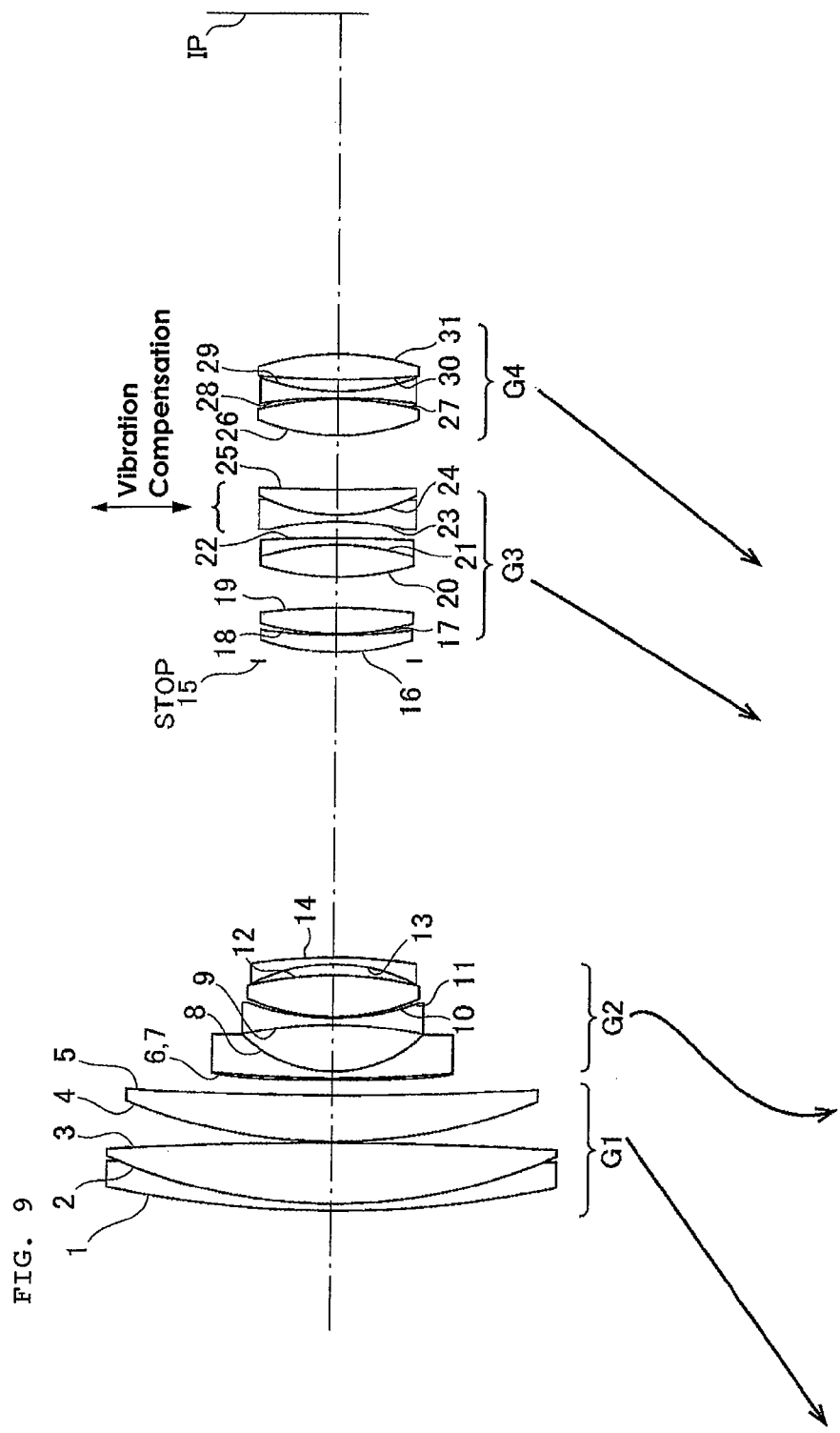
FIG. 9 is a cross-sectional view of optical system illustrating a lens cross section in infinity focusing at wide-angle end and movement of each lens group in zooming of the zoom lens according to the present invention in Example 5.

FIG. 9 shows a lens arrangement of the zoom lens in Example 5. As shown in FIG. 9, the zoom lens in Example 5 is constituted by the first lens group G1 having positive refracting power, the second lens group G2 having negative refracting power, the third lens group G3 having positive refracting power and the fourth lens group G4 as the lens group P having positive refracting power in order from the object side. Specific lens arrangement is shown in FIG. 9. The second lens group G2 is a focusing lens group, and the second lens group G2 moves along the optical axis in focusing from infinity to a close object the same as in Example 1. The rear group of the third lens group G3 is a vibration compensation lens group. Movement of each lens group in magnification change is shown in FIG. 9.

(2) Optical Data

Optical data in Example 5 is shown below.
Focal length (f): 17.45-71.00-272.00
F number (Fno): 3.46-6.16-6.5
Half image viewing angle (ω): 41.3-11.21-3.19
Paraxial image height: 15.33-14.07-14.17
The zoom lens in Example 5 is a wide-angle high-magnification change-ratio zoom lens in which the image viewing angle at wide-angle end is 82.6° and the magnification change ratio is 15.59.

(3) Lens Data

Lens data of the zoom lens in Example 5 is shown in Table 13. The aspheric surface coefficient of each aspheric surface is shown in Table 14. Lens gap change at wide-angle end (f=17.45), intermediate focal length (f=71.00) and telephoto end (f=272.00) of the zoom lens in Example 5 is shown in Table 15.

TABLE 13

| NS | R | D | Nd | ABV |
|---|---|---|---|---|
| 1 | 131.3717 | 0.8000 | 1.90366 | 31.31 |
| 2 | 66.7678 | 7.0000 | 1.49700 | 81.61 |
| 3 | −464.2466 | 0.1500 | | |
| 4 | 65.2807 | 5.3000 | 1.61800 | 63.39 |
| 5 | 409.1317 | D(5) | | |
| 6 ASPH | 676.6589 | 0.2000 | 1.51460 | 49.96 |

TABLE 13-continued

| NS | R | D | Nd | ABV |
|---|---|---|---|---|
| 7 | 156.0324 | 0.8000 | 1.88300 | 40.80 |
| 8 | 15.5678 | 5.3567 | | |
| 9 | −53.1436 | 0.8000 | 1.77250 | 49.62 |
| 10 | 30.2329 | 0.1500 | | |
| 11 | 26.0525 | 4.7633 | 1.84666 | 23.78 |
| 12 | −43.0523 | 1.2973 | | |
| 13 ASPH | −21.3917 | 0.8000 | 1.77250 | 49.62 |
| 14 ASPH | −64.9927 | D(14) | | |
| 15 STOP | 0.0000 | 1.0000 | | |
| 16 | 28.3600 | 1.9988 | 1.61800 | 63.39 |
| 17 | 70.0338 | 0.1500 | | |
| 18 | 34.9754 | 3.0105 | 1.49700 | 61.61 |
| 19 | −74.2775 | 3.6025 | | |
| 20 | 31.9251 | 3.7145 | 1.48749 | 70.44 |
| 21 | −29.6526 | 0.8000 | 1.84666 | 23.78 |
| 22 | −152.2795 | 1.9162 | | |
| 23 ASPH | −33.1065 | 0.8000 | 1.85135 | 40.10 |
| 24 | 20.7343 | 2.9440 | 1.80809 | 22.76 |
| 25 | 229.9315 | D(25) | | |
| 26 ASPH | 23.1022 | 4.1937 | 1.58313 | 59.46 |
| 27 ASPH | −34.0243 | 0.1500 | | |
| 28 | −65.0222 | 0.8000 | 1.90366 | 31.31 |
| 29 | 28.8674 | 1.3178 | | |
| 30 | 106.6005 | 2.9468 | 1.58689 | 36.17 |
| 31 | −31.9422 | D(31) | | |

TABLE 14

| ASPH | K<br>8(D) | 2(A)<br>10(E) | 4(B)<br>12(F) | 6(C) |
|---|---|---|---|---|
| 6 | 0.0000<br>4.46051e−010 | 0.00000e+000<br>−1.51940e−014 | 2.18430e−005<br>2.44319e−015 | −8.31347e−008 |
| 23 | 0.0000<br>1.97761e−009 | 0.00000e+000<br>−1.26109e−011 | 1.26555e−005<br>0.00000e+000 | −8.47651e−008 |
| 26 | 0.0000<br>3.85212e−010 | 0.00000e+000<br>−1.93159e−011 | −2.29191e−005<br>0.00000e+000 | 1.05570e−007 |
| 27 | −14.3071<br>6.63472e−011 | 0.00000e+000<br>−1.97866e−011 | −2.00617e−005<br>0.00000e+000 | 2.27088e−007 |

TABLE 15

| Focal Length | 17.4500 | 71.0002 | 272.0010 |
|---|---|---|---|
| D(5) | 1.7715 | 28.0761 | 65.6960 |
| D(14) | 34.2029 | 11.9185 | 1.5000 |
| D(25) | 6.1420 | 1.7036 | 0.9000 |
| D(31) | 39.0644 | 90.4302 | 98.9566 |

(4) Conditional Expression

Figure 10:
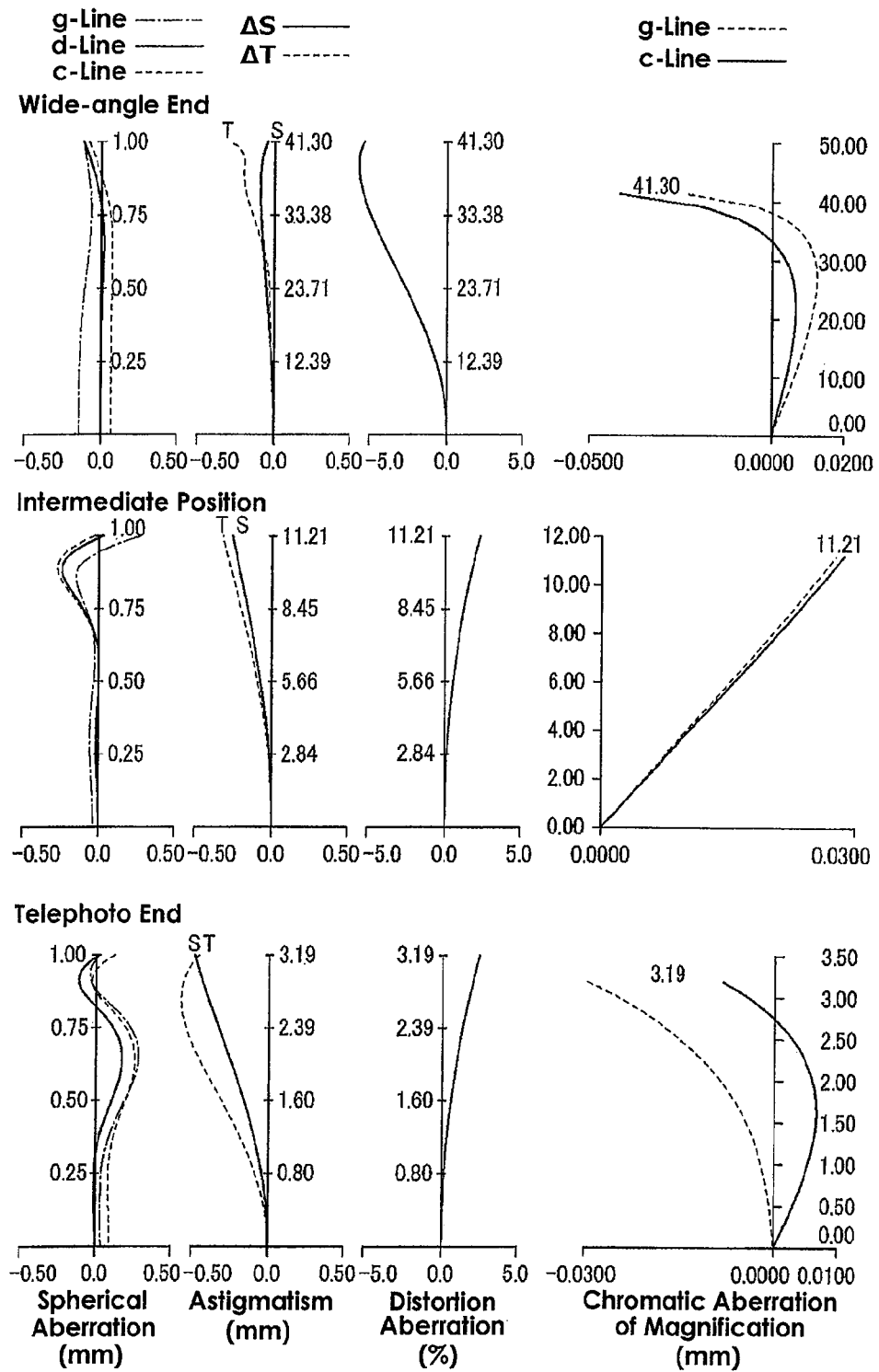
FIG. 10 is a spherical aberration diagram, astigmatism diagram, distortion aberration diagram and chromatic aberration of magnification diagram in infinity focusing at a wide-angle end, intermediate position and telephoto end of the zoom lens according to the present invention in 5.

The values of conditional expressions (1) to (8) in Example 5 are shown in Table 37. So, the zoom lens in Example 5 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 10.

Example 6

(1) Lens Arrangement of Zoom Lens

Figure 11:
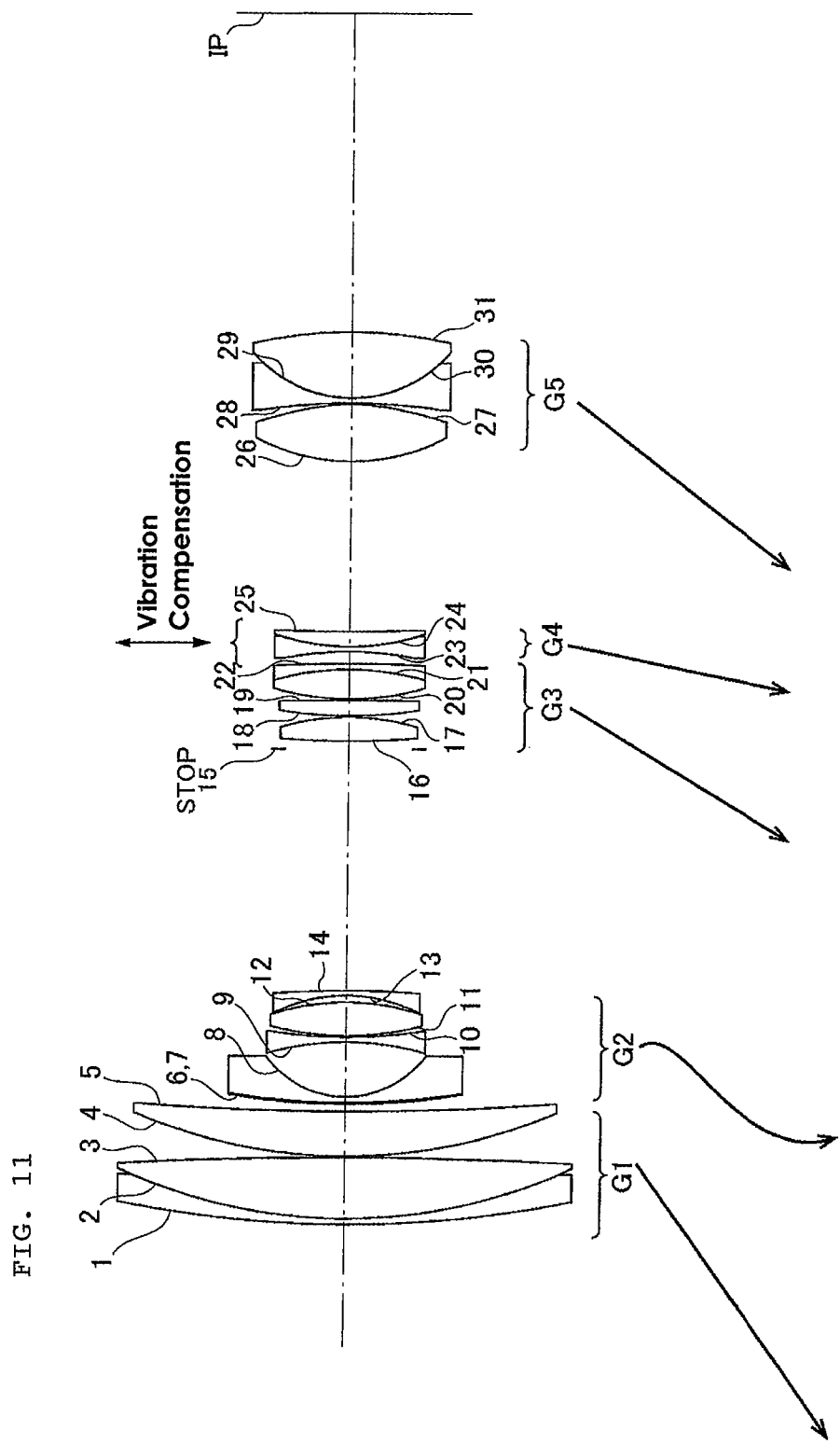
FIG. 11 is a cross-sectional view of optical system illustrating a lens cross section in infinity focusing at wide-angle end and movement of each lens group in zooming of the zoom lens according to the present invention in Example 6.

FIG. 11 shows a lens arrangement of the zoom lens in Example 6. As shown in FIG. 11, the zoom lens in Example 6 is constituted by the first lens group G1 having positive refracting power, the second lens group G2 having negative refracting power, the third lens group G3 having positive refracting power, the fourth lens group G4 having negative refracting power and the fifth lens group G5 as the lens group P having positive refracting power in order from the object side. Specific lens arrangement is shown in FIG. 11. The second lens group G2 is a focusing lens group, and the second lens group G2 moves along the optical axis in focusing from infinity to a close object the same as in Example 1. The forth lens group G4 is a vibration compensation lens group in Example 6. Movement of each lens group in magnification change is shown in FIG. 11.

(2) Optical Data

Optical data in Example 6 is shown below.
Focal length (f): 14.5-71.00-272.02
F number (Fno): 3.46-6.0-6.5
Half image viewing angle (ω): 45.69-11.21-3.00
Paraxial image height: 14.85-14.08-14.25

The zoom lens in Example 6 is a wide-angle high-magnification change-ratio zoom lens in which the image viewing angle at wide-angle end is 91.38° and the magnification change ratio is 18.76.

(3) Lens Data

Lens data of the zoom lens in Example 6 is shown in Table 16. The aspheric surface coefficient of each aspheric surface is shown in Table 17. Lens gap change at wide-angle end (f=14.5), intermediate focal length (f=71.00) and telephoto end (f=272.02) of the zoom lens in Example 6 is shown in Table 18.

TABLE 16

| NS | R | D | Nd | ABV |
|---|---|---|---|---|
| 1 | 141.3206 | 0.7000 | 2.00100 | 29.13 |
| 2 | 67.1199 | 7.4000 | 1.49700 | 81.61 |
| 3 | −570.2294 | 0.1500 | | |
| 4 | 67.1283 | 5.4000 | 1.77250 | 49.62 |
| 5 | 347.4215 | D(5) | | |
| 6 ASPH | 155.7006 | 0.1500 | 1.51460 | 49.96 |
| 7 | 91.7164 | 0.7000 | 1.80420 | 46.50 |
| 8 | 12.4803 | 6.6058 | | |
| 9 | −36.3576 | 0.6000 | 1.77250 | 49.62 |
| 10 | 64.0745 | 0.1500 | | |
| 11 | 37.7241 | 4.0000 | 1.84666 | 23.78 |
| 12 | −30.9989 | 0.8258 | | |
| 13 ASPH | −19.5941 | 0.6000 | 1.76802 | 49.24 |
| 14 ASPH | −121.2709 | D(14) | | |
| 15 STOP | 0.0000 | 1.0000 | | |
| 16 | 110.0702 | 2.9015 | 1.48749 | 70.44 |
| 17 | −29.7774 | 0.1500 | | |
| 18 | 56.1043 | 1.8716 | 1.49700 | 81.61 |

TABLE 16-continued

| NS | R | D | Nd | ABV |
|---|---|---|---|---|
| 19 | −324.7767 | 0.1500 | | |
| 20 | 33.9089 | 3.5948 | 1.49700 | 81.61 |
| 21 | −34.5204 | 0.7000 | 1.90366 | 31.31 |
| 22 | −184.1200 | D(22) | | |
| 23 ASPH | −41.5578 | 0.6000 | 1.85135 | 40.10 |
| 24 | 29.6223 | 1.8352 | 1.80809 | 22.76 |
| 25 | 340.7542 | D(25) | | |
| 26 ASPH | 25.4233 | 6.9230 | 1.59201 | 67.02 |
| 27 ASPH | −27.5580 | 0.1500 | | |
| 28 | −76.3485 | 0.6000 | 1.91082 | 35.25 |
| 29 | 16.2583 | 8.0000 | 1.58144 | 40.89 |
| 30 | −55.2633 | D(30) | | |

TABLE 17

| ASPH | K<br>8(D) | 2(A)<br>10(E) | 4(B)<br>12(F) | 6(C) |
|---|---|---|---|---|
| 6 | −99.0000 | 0.00000e+000 | 3.19113e−005 | −6.09416e−008 |
|   | −6.16633e−010 | 4.16393e−012 | −8.71150e−015 | |
| 13 | 0.1506 | 0.00000e+000 | 8.24233e−006 | 1.90796e−007 |
|    | 9.15375e−010 | −2.92504e−011 | 1.70519e−013 | |
| 14 | 0.0000 | 0.00000e+000 | −5.03049e−006 | 2.23257e−007 |
|    | −2.19378e−009 | 3.01896e−012 | 4.87395e−014 | |
| 24 | 2.4388e−009 | 0.00000e+000 | 7.66374e−006 | 1.35133e−007 |
|    | −3.06387e−009 | 3.35343e−011 | −1.36596e−013 | |
| 26 | 0.2142 | 0.00000e+000 | −4.32424e−006 | −5.90044e−008 |
|    | 1.73767e−009 | −1.44341e−011 | 4.35911e−014 | |
| 27 | −6.2586 | 0.00000e+000 | −1.42350e−005 | 5.87142e−008 |
|    | 9.34904e−010 | −1.08254e−011 | 3.65589e−014 | |

TABLE 18

| Focal Length | 14.5000 | 70.9999 | 272.0188 |
|---|---|---|---|
| D(5) | 0.9000 | 29.3915 | 68.5240 |
| D(14) | 29.2069 | 8.2369 | 1.0000 |
| D(22) | 1.4488 | 9.4246 | 6.8364 |
| D(25) | 20.6087 | 3.2118 | 1.0000 |
| D(30) | 38.2439 | 90.2666 | 96.6104 |

(4) Conditional Expression

Figure 12:
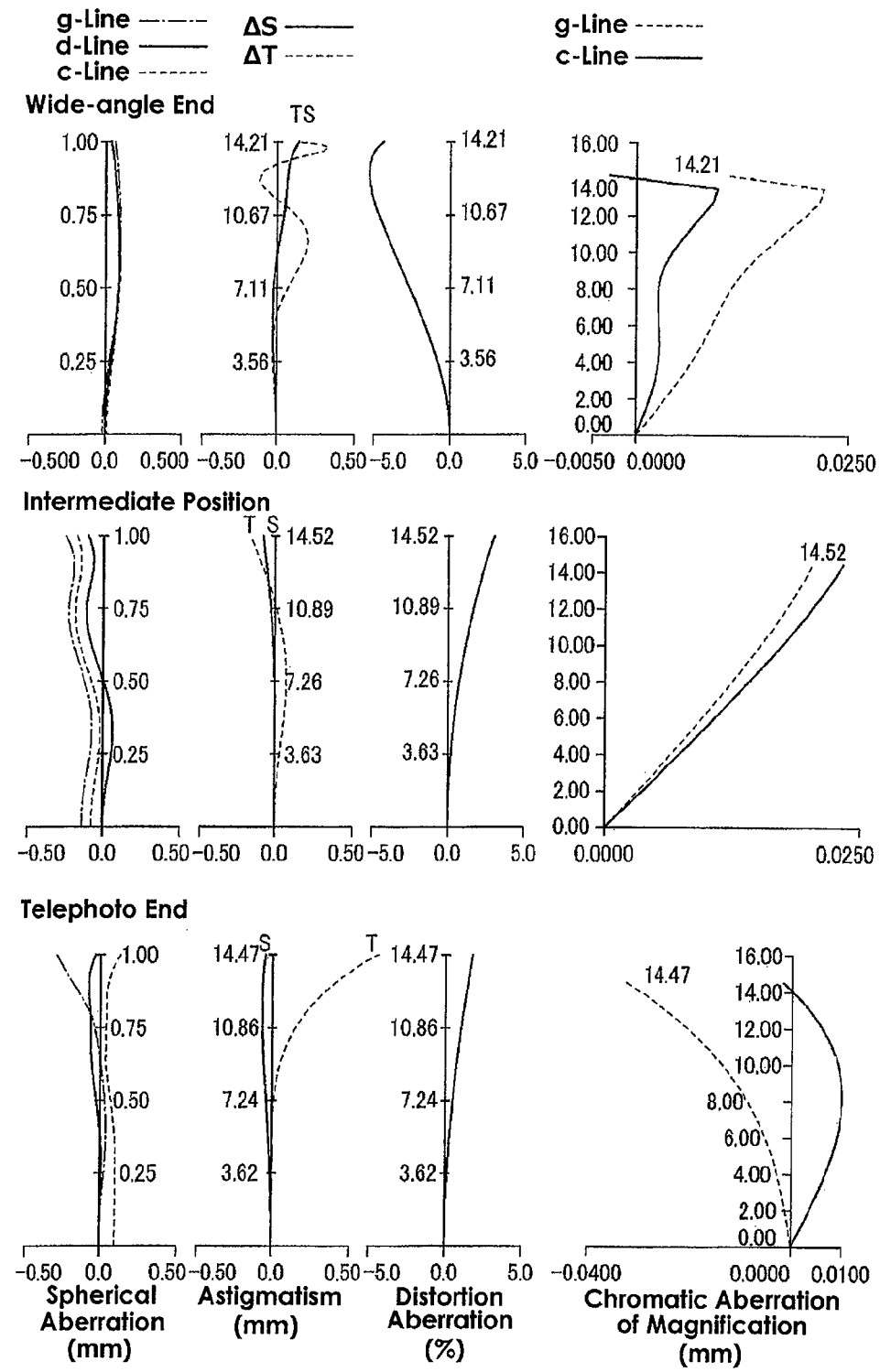
FIG. 12 is a spherical aberration diagram, astigmatism diagram, distortion aberration diagram and chromatic aberration of magnification diagram in infinity focusing at a wide-angle end, intermediate position and telephoto end of the zoom lens according to the present invention in 6.

The values of conditional expressions (1) to (8) in Example 6 are shown in Table 37. So, the zoom lens in Example 6 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 12.

Example 7

(1) Lens Arrangement of Zoom Lens

Figure 13:
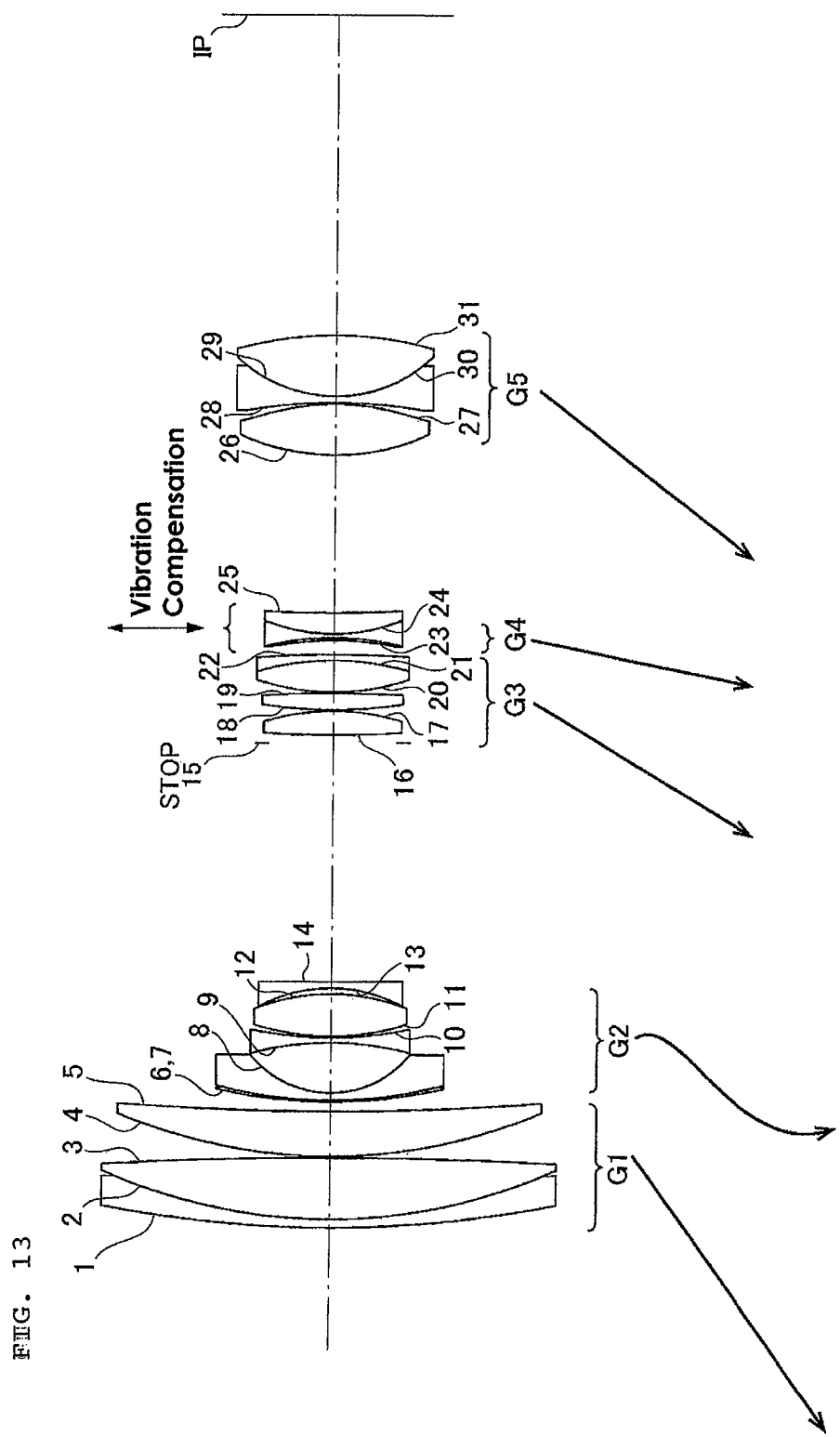
FIG. 13 is a cross-sectional view of optical system illustrating a lens cross section in infinity focusing at wide-angle end and movement of each lens group in zooming of the zoom lens according to the present invention in Example 7.

FIG. 13 shows a lens arrangement of the zoom lens in Example 7. As shown in FIG. 13, the zoom lens in Example 7 is constituted by the first lens group G1 having positive refracting power, the second lens group G2 having negative refracting power, the third lens group G3 having positive refracting power, the fourth lens group G4 having negative refracting power and the fifth lens group G5 as the lens group P having positive refracting power in order from the object side. Specific lens arrangement is shown in FIG. 13. The second lens group G2 is a focusing lens group, and the second lens group G2 moves along the optical axis in focusing from infinity to a close object the same as in Example 1. The forth lens group G4 is a vibration compensation lens group the same as in Example 6. Movement of each lens group in magnification change is shown in FIG. 13.

(2) Optical Data

Optical data in Example 7 is shown below.
Focal length (f): 15.4-71.00-277.00
F number (Fno): 3.46-6.1-6.5
Half image viewing angle (ω): 43.95-11.00-2.89
Paraxial image height: 14.85-13.80-13.96

The zoom lens in Example 8 is a wide-angle high-magnification change-ratio zoom lens in which the image viewing angle at wide-angle end is 87.90° and the magnification change ratio is 17.99.

(3) Lens Data

Lens data of the zoom lens in Example 7 is shown in Table 19. The aspheric surface coefficient of each aspheric surface is shown in Table 20. Lens gap change at wide-angle end (f=15.4), intermediate focal length (f=71.00) and telephoto end (f=277.00) of the zoom lens in Example 7 is shown in Table 21.

TABLE 19

| NS | R | D | Nd | ABV |
|---|---|---|---|---|
| 1 | 146.4613 | 1.0000 | 2.00100 | 29.13 |
| 2 | 68.6824 | 7.4000 | 1.49700 | 81.61 |
| 3 | −521.4721 | 0.1500 | | |
| 4 | 67.4950 | 5.4000 | 1.77250 | 49.62 |
| 5 | 339.6253 | D(5) | | |
| 6 ASPH | 71.8271 | 0.1500 | 1.51460 | 49.96 |
| 7 | 55.9479 | 0.9000 | 1.88100 | 40.14 |
| 8 | 12.9176 | 5.9875 | | |
| 9 | −37.9497 | 0.6000 | 1.80420 | 46.50 |
| 10 | 48.1639 | 0.1500 | | |
| 11 | 31.0220 | 5.0994 | 1.84666 | 23.78 |
| 12 | −26.1971 | 0.7217 | | |
| 13 ASPH | −18.3457 | 0.8000 | 1.76802 | 49.24 |
| 14 ASPH | 3147.1692 | D(14) | | |
| 15 STOP | 0.0000 | 1.0000 | | |
| 16 | 134.3202 | 2.8755 | 1.48749 | 70.44 |
| 17 | −29.0354 | 0.1500 | | |
| 18 | 56.6270 | 1.9917 | 1.49700 | 81.61 |
| 19 | −166.3895 | 0.1500 | | |
| 20 | 30.1649 | 3.8151 | 1.48749 | 70.44 |
| 21 | −33.7090 | 0.7000 | 1.84666 | 23.78 |

TABLE 19-continued

| NS | R | D | Nd | ABV |
|---|---|---|---|---|
| 22 | −135.5451 | D(22) | | |
| 23 ASPH | −40.5343 | 0.3000 | 1.85135 | 40.10 |
| 24 | −36.8800 | 0.5000 | 1.85135 | 40.10 |
| 25 | 22.6872 | 2.5301 | 1.80809 | 22.76 |
| 26 ASPH | 160.1278 | D(26) | | |
| 27 ASPH | 29.1119 | 6.1261 | 1.59201 | 67.02 |
| 28 | −28.1541 | 0.1500 | | |
| 29 | −67.2027 | 0.8000 | 1.91082 | 35.25 |
| 30 | 17.8104 | 7.2918 | 1.58144 | 40.89 |
| 31 | −46.0857 | D(31) | | |

TABLE 20

| ASPH | K 8(D) | 2(A) 10(E) | 4(B) 12(F) | 6(C) |
|---|---|---|---|---|
| 6 | −49.2515 | 0.00000e+000 | 2.65094e−005 | −7.65739e−008 |
|   | −1.10074e−010 | 8.85683e−013 | −5.43279e−016 | |
| 13 | 0.1695 | 0.00000e+000 | 7.20960e−006 | 1.69044e−007 |
|   | 9.74789e−010 | −2.64547e−011 | 1.48799e−013 | |
| 14 | 0.0000 | 0.00000e+000 | −1.08443e−005 | 2.18949e−007 |
|   | −1.96090e−009 | 3.15798e−012 | 4.38386e−014 | |
| 23 | 1.7509 | 0.00000e+000 | 9.74833e−006 | 1.00042e−007 |
|   | −2.42200e−009 | 2.83977e−011 | −1.23217e−013 | |
| 27 | 0.3174 | 0.00000e+000 | −5.39864e−006 | 2.68439e−008 |
|   | 9.11031e−010 | −1.45035e−011 | 7.19663e−014 | |
| 28 | −5.6992 | 0.00000e+000 | −1.28014e−005 | 9.03914e−008 |
|   | 6.68432e−010 | −1.48316e−011 | 7.76135e−014 | |

TABLE 21

| Focal Length | 15.4000 | 71.0002 | 277.0005 |
|---|---|---|---|
| D(5) | 1.2000 | 31.1004 | 69.2051 |
| D(14) | 28.6697 | 8.5988 | 1.3500 |
| D(22) | 1.6955 | 7.2819 | 5.8082 |
| D(26) | 18.9980 | 3.6478 | 1.2000 |
| D(31) | 38.2441 | 86.9374 | 96.3375 |

(4) Conditional Expression

Figure 14:
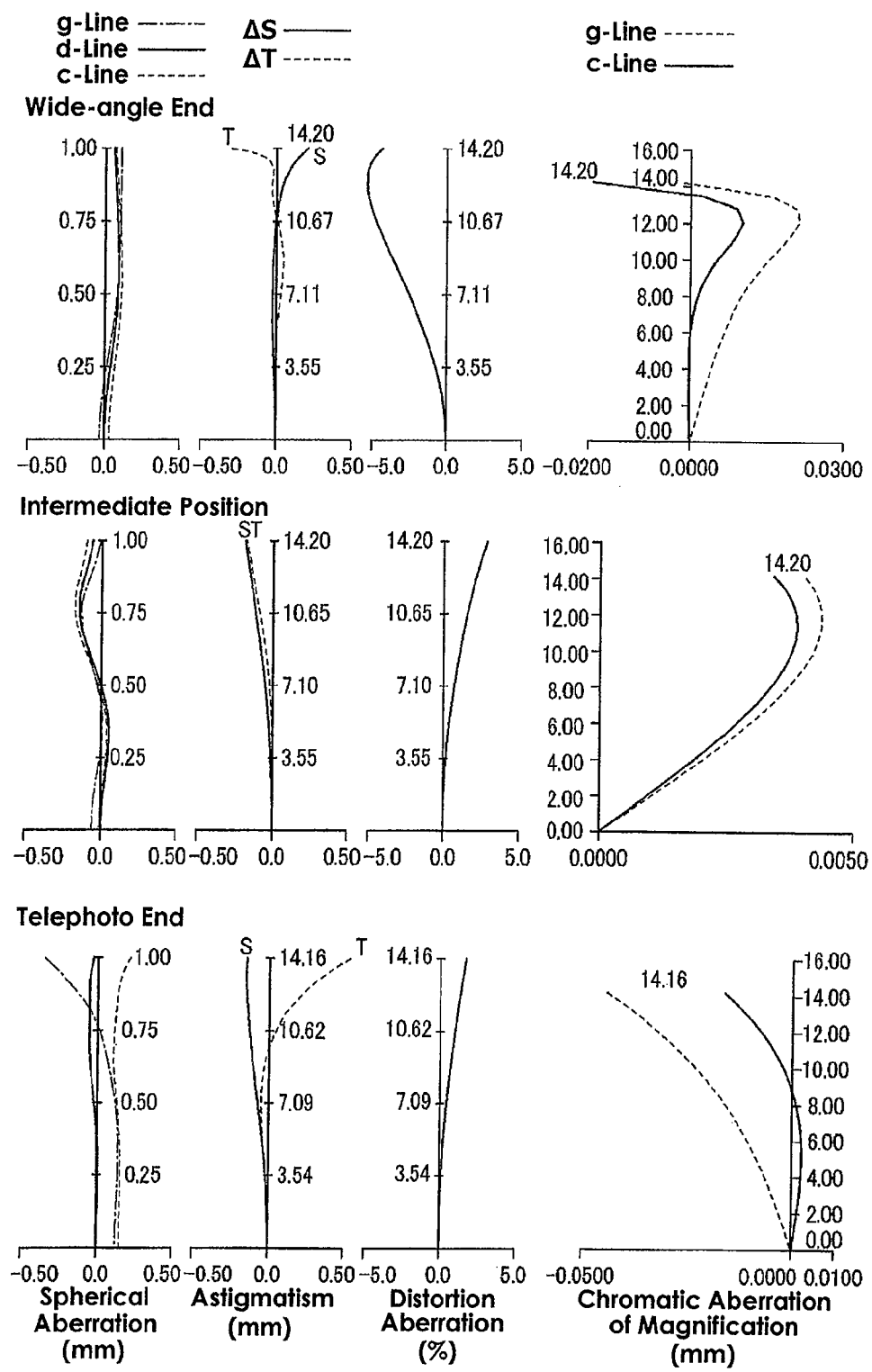
FIG. 14 is a spherical aberration diagram, astigmatism diagram, distortion aberration diagram and chromatic aberration of magnification diagram in infinity focusing at a wide-angle end, intermediate position and telephoto end of the zoom lens according to the present invention in 7.

The values of conditional expressions (1) to (8) in Example 7 are shown in Table 37. So, the zoom lens in Example 7 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 14.

Example 8

(1) Lens Arrangement of Zoom Lens

Figure 15:
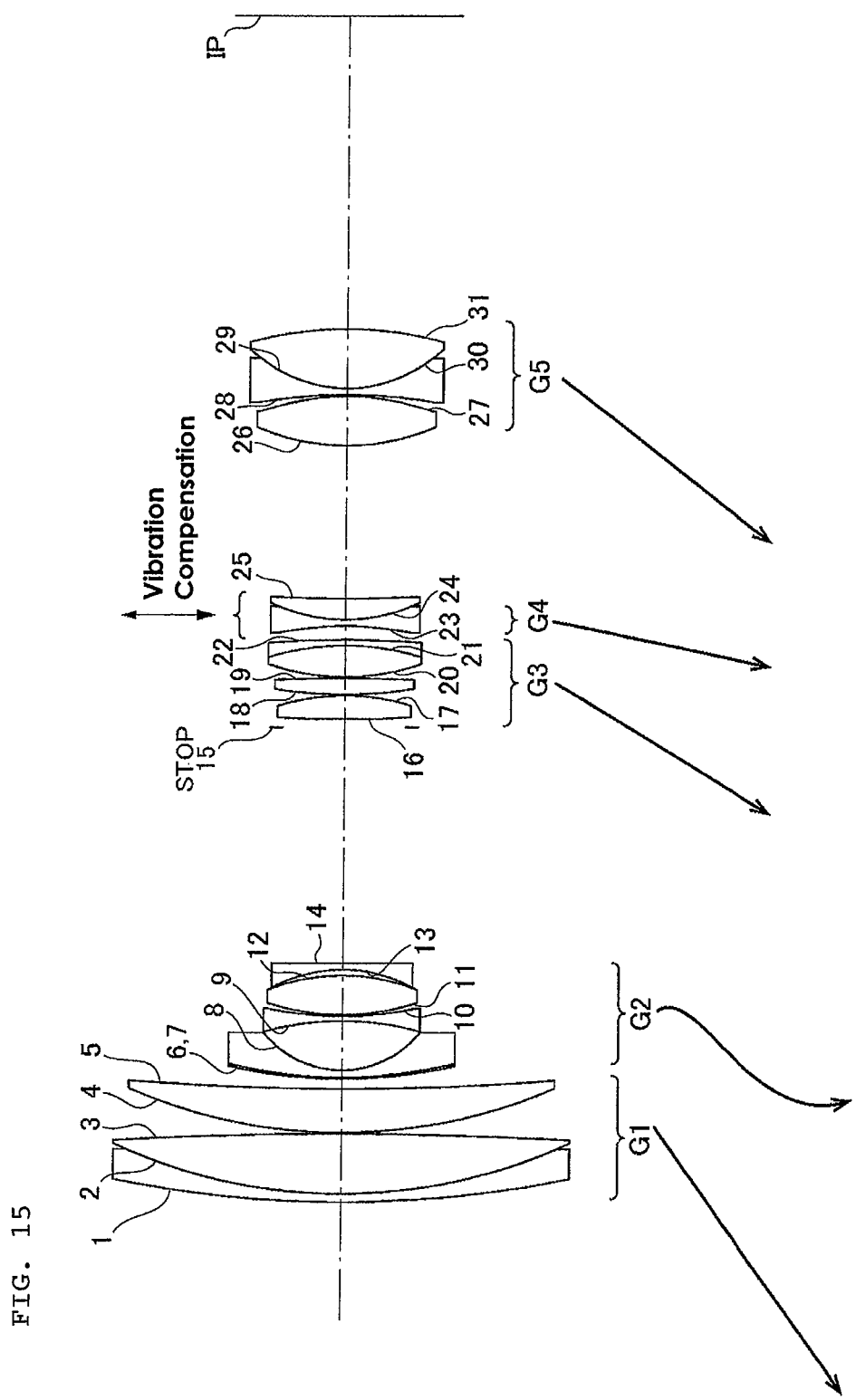
FIG. 15 is a cross-sectional view of optical system illustrating a lens cross section in infinity focusing at wide-angle end and movement of each lens group in zooming of the zoom lens according to the present invention in Example 8.

FIG. 15 shows a lens arrangement of the zoom lens in Example 8. As shown in FIG. 15, the zoom lens in Example 8 is constituted by the first lens group G1 having positive refracting power, the second lens group G2 having negative refracting power, the third lens group G3 having positive refracting power, the fourth lens group G4 having negative refracting power and the fifth lens group G5 as the lens group P having positive refracting power in order from the object side. Specific lens arrangement is shown in FIG. 15. The second lens group G2 is a focusing lens group, and the second lens group G2 moves along the optical axis in focusing from infinity to a close object the same as in Example 1. The fourth lens group G4 is a vibration compensation lens group the same as in Example 6. Movement of each lens group in magnification change is shown in FIG. 15.

(2) Optical Data

Optical data in Example 8 is shown below.
Focal length (f): 15.4-71.00-290.65
F number (Fno): 3.6-6.0-6.5
Half image viewing angle (ω): 43.95-11.00-2.75
Paraxial image height: 14.85-13.80-13.96

The zoom lens in Example 8 is a wide-angle high-magnification change-ratio zoom lens in which the image viewing angle at wide-angle end is 87.90° and the magnification change ratio is 18.87.

(3) Lens Data

Lens data of the zoom lens in Example 8 is shown in Table 22. The aspheric surface coefficient of each aspheric surface is shown in Table 23. Lens gap change at wide-angle end (f=15.4), intermediate focal length (f=71.00) and telephoto end (f=290.65) of the zoom lens in Example 8 is shown in Table 24.

TABLE 22

| NS | R | D | Nd | ABV |
|---|---|---|---|---|
| 1 | 144.6669 | 1.0000 | 2.00100 | 29.13 |
| 2 | 68.4624 | 7.4000 | 1.49700 | 81.61 |
| 3 | −544.2159 | 0.1500 | | |
| 4 | 67.7999 | 5.4000 | 1.77250 | 49.62 |
| 5 | 346.3442 | D(5) | | |
| 6 ASPH | 72.6695 | 0.1500 | 1.51460 | 49.96 |
| 7 | 58.3570 | 0.9000 | 1.88100 | 40.14 |
| 8 | 12.9586 | 5.9873 | | |
| 9 | −37.6142 | 0.6000 | 1.80420 | 46.50 |
| 10 | 48.5262 | 0.1500 | | |
| 11 | 31.1744 | 4.8245 | 1.84666 | 23.78 |
| 12 | −26.1476 | 0.7305 | | |
| 13 ASPH | −18.3097 | 0.8000 | 1.76802 | 49.24 |
| 14 ASPH | 0.0000 | D(14) | | |
| 15 STOP | 0.0000 | 1.0000 | | |
| 16 | 130.9741 | 2.8878 | 1.48749 | 70.44 |
| 17 | −29.2569 | 0.1500 | | |
| 18 | 55.8468 | 1.9994 | 1.49700 | 81.61 |
| 19 | −174.2269 | 0.1500 | | |
| 20 | 30.1239 | 3.8408 | 1.48749 | 70.44 |
| 21 | −33.6400 | 0.7000 | 1.84666 | 23.78 |
| 22 | −136.2337 | D(22) | | |
| 23 ASPH | −40.8091 | 0.8000 | 1.85135 | 40.10 |
| 24 | 22.3863 | 2.5753 | 1.80809 | 22.76 |
| 25 | 156.8088 | D(25) | | |
| 26 ASPH | 29.1110 | 6.0971 | 1.59201 | 67.02 |

TABLE 22-continued

| NS | R | D | Nd | ABV |
|---|---|---|---|---|
| 27 ASPH | −28.1446 | 0.1500 | | |
| 28 | −67.3899 | 0.8000 | 1.91082 | 35.25 |
| 29 | 17.7901 | 7.2082 | 1.58144 | 40.89 |
| 30 | −46.8305 | D(30) | | |

TABLE 23

| ASPH | K<br>8(D) | 2(A)<br>10(E) | 4(B)<br>12(F) | 6(C) |
|---|---|---|---|---|
| 6 | −47.1598<br>−1.06320e−010 | 0.00000e+000<br>9.31246e−013 | 2.67438e−005<br>−6.71574e−016 | −7.82379e−008 |
| 13 | 0.1727<br>9.80200e−010 | 0.00000e+000<br>−2.62742e−011 | 7.11602e−006<br>1.48479e−013 | 1.67886e−007 |
| 14 | 0.0000<br>−1.96125e−009 | 0.00000e+000<br>3.09072e−012 | −1.07757e−005<br>4.33823e−014 | 2.19692e−007 |
| 23 | 1.7407<br>−2.42229e−009 | 0.00000e+000<br>2.83914e−011 | 9.77193e−006<br>−1.23094e−013 | 1.00206e−007 |
| 26 | 0.3176<br>9.10898e−010 | 0.00000e+000<br>−1.45058e−011 | −5.39421e−006<br>7.19777e−014 | 2.67135e−008 |
| 27 | −5.7013<br>6.68833e−010 | 0.00000e+000<br>−1.48346e−011 | −1.27791e−005<br>7.75378e−014 | 9.06536e−008 |

TABLE 24

| Focal Length | 15.4000 | 71.0002 | 290.6463 |
|---|---|---|---|
| D(5) | 1.2000 | 30.7353 | 70.3000 |
| D(14) | 29.0607 | 8.8226 | 1.1000 |
| D(22) | 1.6950 | 7.2827 | 5.6000 |
| D(25) | 18.9473 | 3.7734 | 1.2000 |
| D(31) | 38.3342 | 87.7098 | 93.9688 |

(4) Conditional Expression

Figure 16:
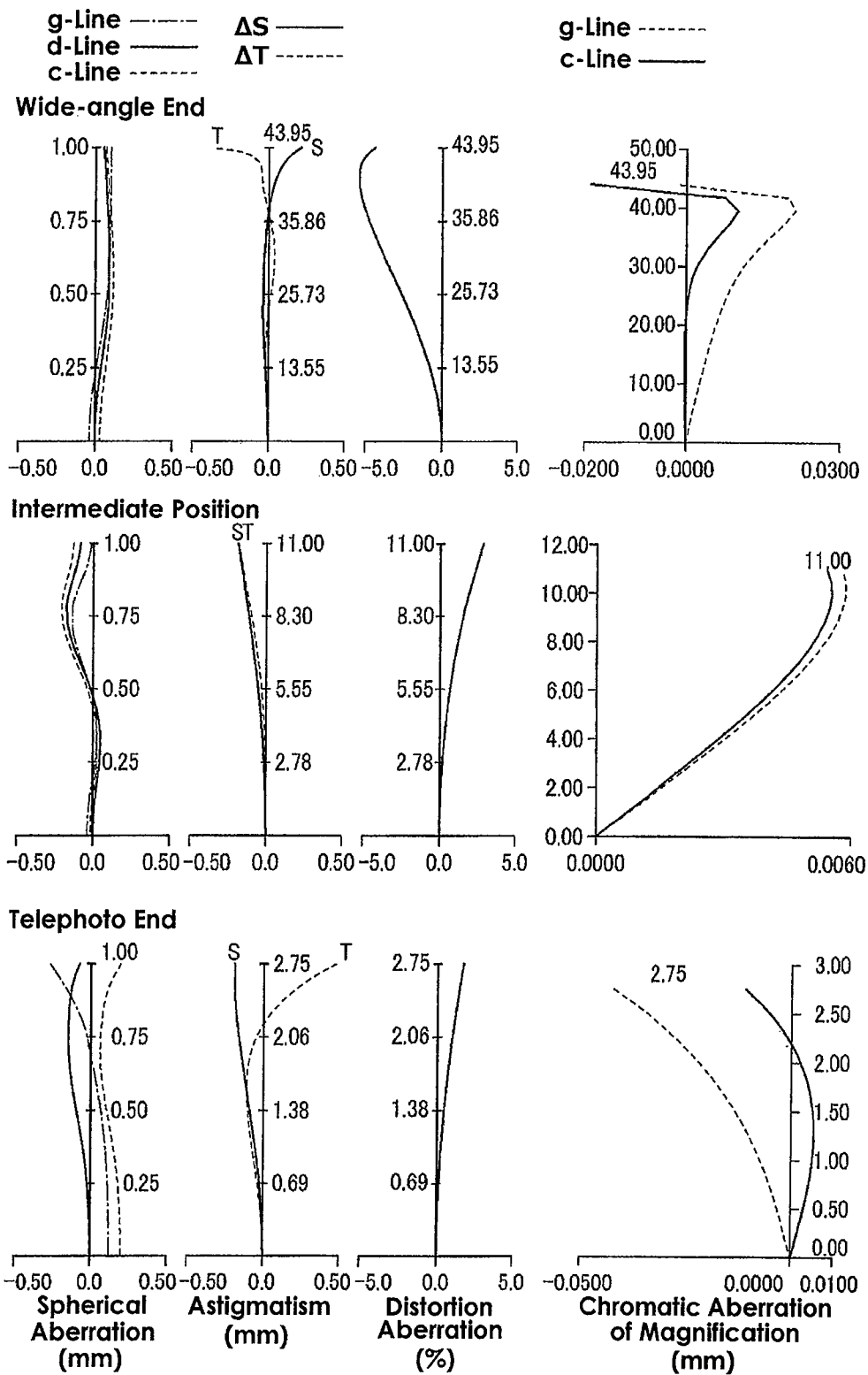
FIG. 16 is a spherical aberration diagram, astigmatism diagram, distortion aberration diagram and chromatic aberration of magnification diagram in infinity focusing at a wide-angle end, intermediate position and telephoto end of the zoom lens according to the present invention in 8.

The values of conditional expressions (1) to (8) in Example 8 are shown in Table 37. So, the zoom lens in Example 8 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 16.

Example 9

(1) Lens Arrangement of Zoom Lens

Figure 17:
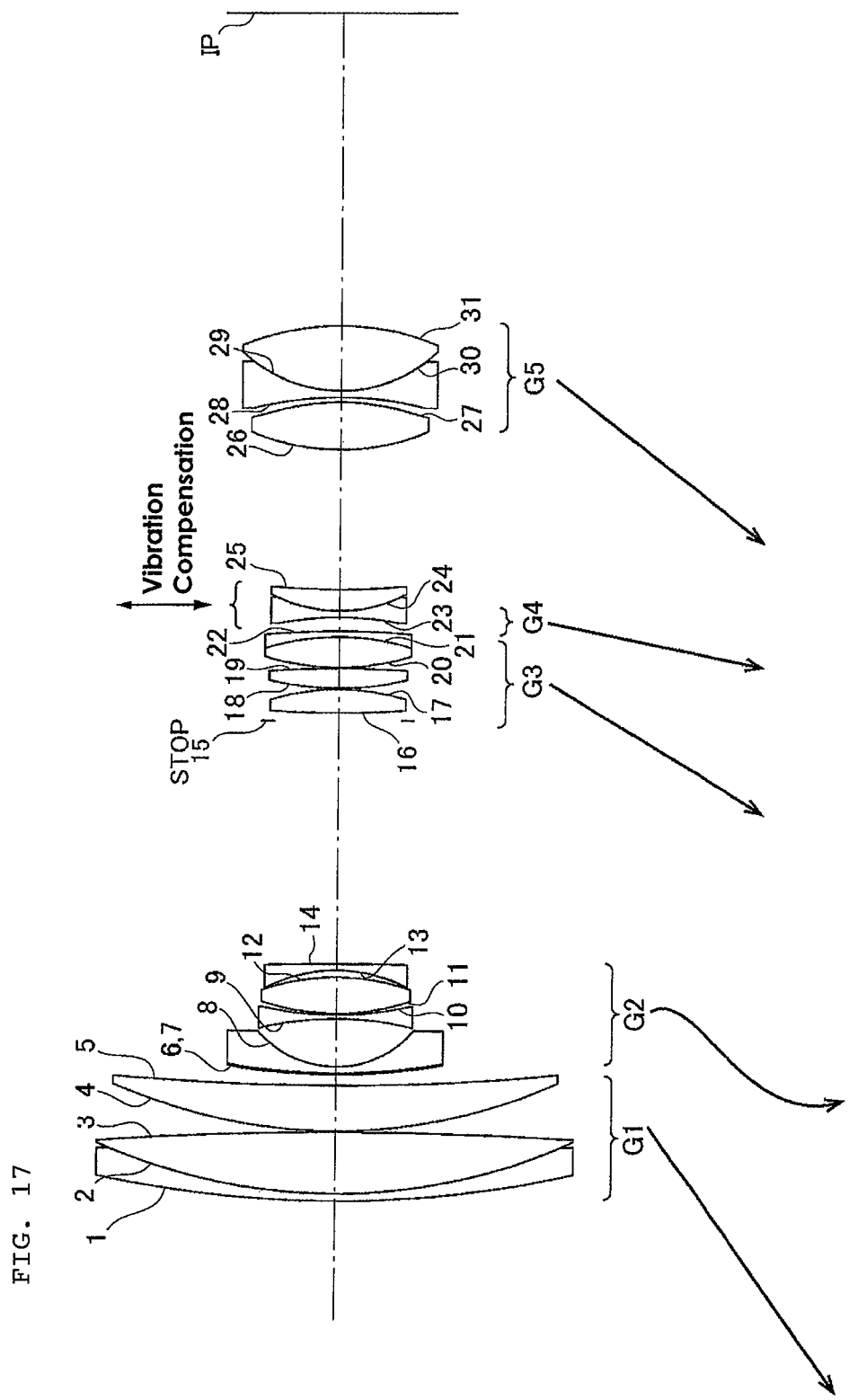
FIG. 17 is a cross-sectional view of optical system illustrating a lens cross section in infinity focusing at wide-angle end and movement of each lens group in zooming of the zoom lens according to the present invention in Example 9.

FIG. 17 shows a lens arrangement of the zoom lens in Example 9. As shown in FIG. 17, the zoom lens in Example 9 is constituted by the first lens group G1 having positive refracting power, the second lens group G2 having negative refracting power, the third lens group G3 having positive refracting power, the fourth lens group G4 having negative refracting power and the fifth lens group G5 as the lens group P having positive refracting power in order from the object side. Specific lens arrangement is shown in FIG. 17. The second lens group G2 is a focusing lens group, and the second lens group G2 moves along the optical axis in focusing from infinity to a close object the same as in Example 1. The fourth lens group G4 is a vibration compensation lens group the same as in Example 6. Movement of each lens group in magnification change ratio is shown in FIG. 17.

(2) Optical Data

Optical data in Example 9 is shown below.

Focal length (f): 16.5-71.00-310.50

F number (Fno): 3.6-6.1-6.5

Half image viewing angle (ω): 42.78-11.21-2.63

Paraxial image height: 15.27-14.07-14.25

The zoom lens in Example 9 is a wide-angle high-magnification change-ratio zoom lens in which the image viewing angle at wide-angle end is 85.56° and the magnification change ratio is 19.12.

(3) Lens Data

Lens data of the zoom lens in Example 9 is shown in Table 25. The aspheric surface coefficient of each aspheric surface is shown in Table 26. Lens gap change at wide-angle end (f=16.5), intermediate focal length (f=71.00) and telephoto end (f=310.50) of the zoom lens in Example 9 is shown in Table 27.

TABLE 25

| NS | R | D | Nd | ABV |
|---|---|---|---|---|
| 1 | 140.0658 | 0.9000 | 2.00100 | 29.13 |
| 2 | 73.2427 | 7.6000 | 1.49700 | 81.61 |
| 3 | −485.2551 | 0.1500 | | |
| 4 | 69.1841 | 5.6000 | 1.72916 | 54.67 |
| 5 | 298.6644 | D(5) | | |
| 6 ASPH | 100.6852 | 0.1500 | 1.51460 | 49.96 |
| 7 | 81.4567 | 0.8000 | 1.88100 | 40.14 |
| 8 | 13.3701 | 5.8279 | | |
| 9 | −42.0907 | 0.5000 | 1.80420 | 46.50 |
| 10 | 43.8391 | 0.1500 | | |
| 11 | 29.7271 | 4.4740 | 1.84666 | 23.78 |
| 12 | −29.3157 | 0.8459 | | |
| 13 ASPH | −19.6296 | 0.8000 | 1.76802 | 49.24 |
| 14 ASPH | −392.3633 | D(14) | | |
| 15 STOP | 0.0000 | 1.0000 | | |
| 16 | 128.4019 | 2.8852 | 1.48749 | 70.44 |
| 17 | −29.8642 | 0.1500 | | |
| 18 | 38.2351 | 2.4180 | 1.49700 | 81.61 |
| 19 | −146.7510 | 0.1500 | | |
| 20 | 32.3955 | 3.7474 | 1.48749 | 70.44 |
| 21 | −32.3955 | 0.7000 | 1.84666 | 23.78 |
| 22 | −112.5443 | D(22) | | |
| 23 ASPH | −39.0420 | 0.8000 | 1.85135 | 40.10 |
| 24 | 18.8714 | 2.6273 | 1.80809 | 22.76 |
| 25 | 90.5333 | D(25) | | |
| 26 ASPH | 30.2567 | 5.8730 | 1.59201 | 67.02 |
| 27 ASPH | −28.0398 | 0.5875 | | |

TABLE 25-continued

| NS | R | D | Nd | ABV |
|----|---|---|----|----|
| 28 | −45.4088 | 0.8000 | 1.91082 | 35.25 |
| 29 | 18.1935 | 7.9689 | 1.58144 | 40.89 |
| 30 | −33.3249 | D(30) | | |

TABLE 26

| ASPH | K<br>8(D) | 2(A)<br>10(E) | 4(B)<br>12(F) | 6(C) |
|------|-----------|---------------|---------------|------|
| 6 | −115.9572 | 0.00000e+000 | 2.57033e−005 | −5.77007e−008 |
|   | −2.95337e−010 | 2.27313e−012 | −4.34751e−015 | |
| 13 | 1.3745 | 0.00000e+000 | 1.42294e−006 | 1.60440e−007 |
|    | 6.48682e−010 | −1.69281e−011 | 9.51585e−014 | |
| 14 | 438.8762 | 0.00000e+000 | −1.46762e−005 | 2.14289e−007 |
|    | −1.55110e−009 | 1.21858e−012 | 4.21075e−014 | |
| 23 | 1.0221 | 0.00000e+000 | 1.23496e−005 | 1.00382e−007 |
|    | −2.52949e−009 | 3.03116e−011 | −1.37838e−013 | |
| 26 | 0.7442 | 0.00000e+000 | −2.55317e−006 | 3.28342e−009 |
|    | 1.01654e−009 | −1.38519e−011 | 7.15908e−014 | |
| 27 | −6.0283 | 0.00000e+000 | −1.19454e−005 | 7.54397e−008 |
|    | 6.45067e−010 | −1.33088e−011 | 7.45016e−014 | |

TABLE 27

| Focal Length | 16.5000 | 71.0002 | 310.5015 |
|--------------|---------|---------|----------|
| D(5) | 1.3639 | 32.2252 | 72.7553 |
| D(14) | 29.9657 | 9.7729 | 1.0000 |
| D(22) | 1.7186 | 5.1694 | 4.1501 |
| D(25) | 17.2861 | 3.6931 | 1.1000 |
| D(31) | 38.2636 | 85.4158 | 94.6531 |

(4) Conditional Expression

Figure 18:
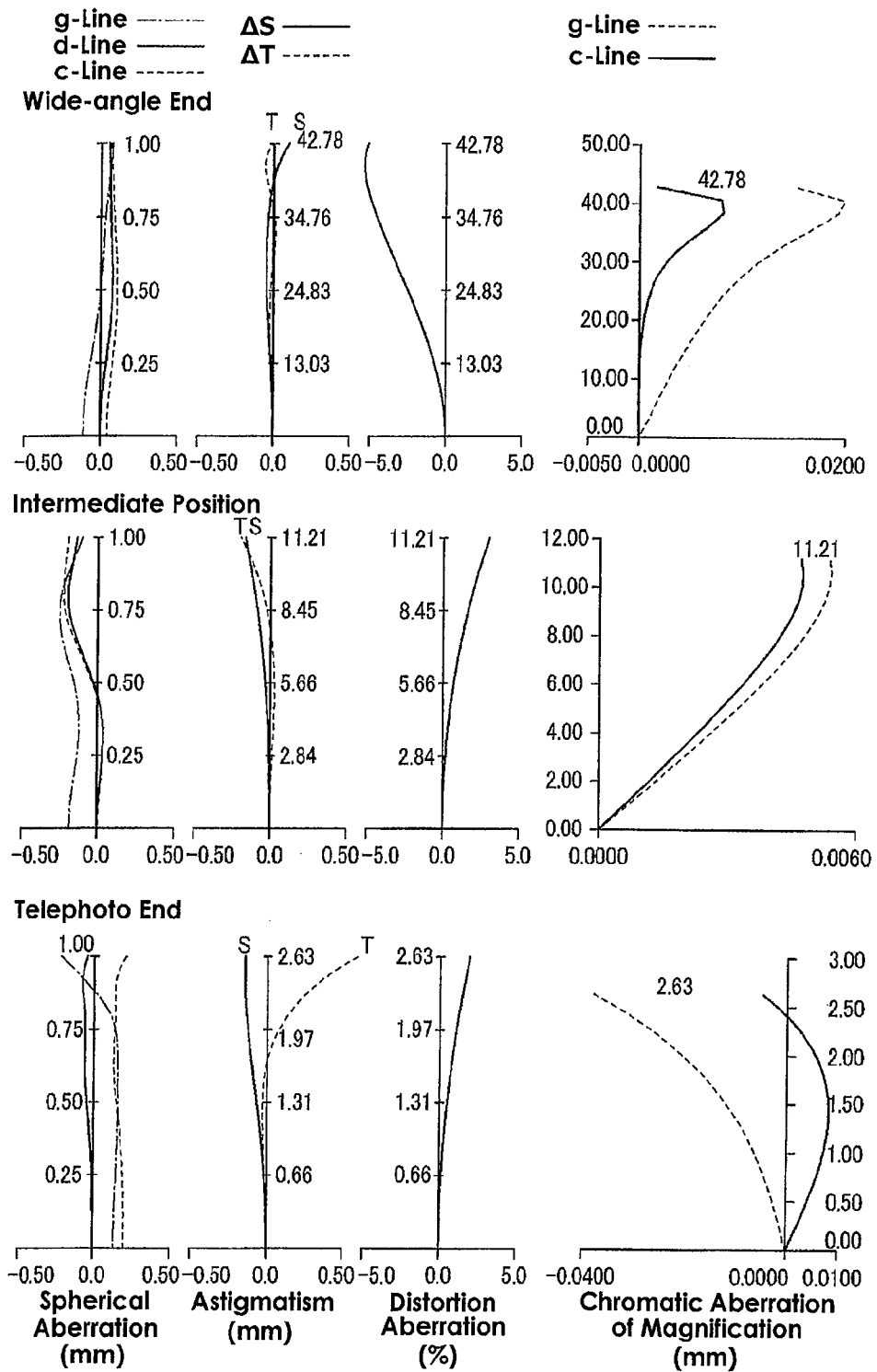
FIG. 18 is a spherical aberration diagram, astigmatism diagram, distortion aberration diagram and chromatic aberration of magnification diagram in infinity focusing at a wide-angle end, intermediate position and telephoto end of the zoom lens according to the present invention in 9.

The values of conditional expressions (1) to (8) in Example 9 are shown in Table 37. So, the zoom lens in Example 9 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 18.

Example 10

(1) Lens Arrangement of Zoom Lens

Figure 19:
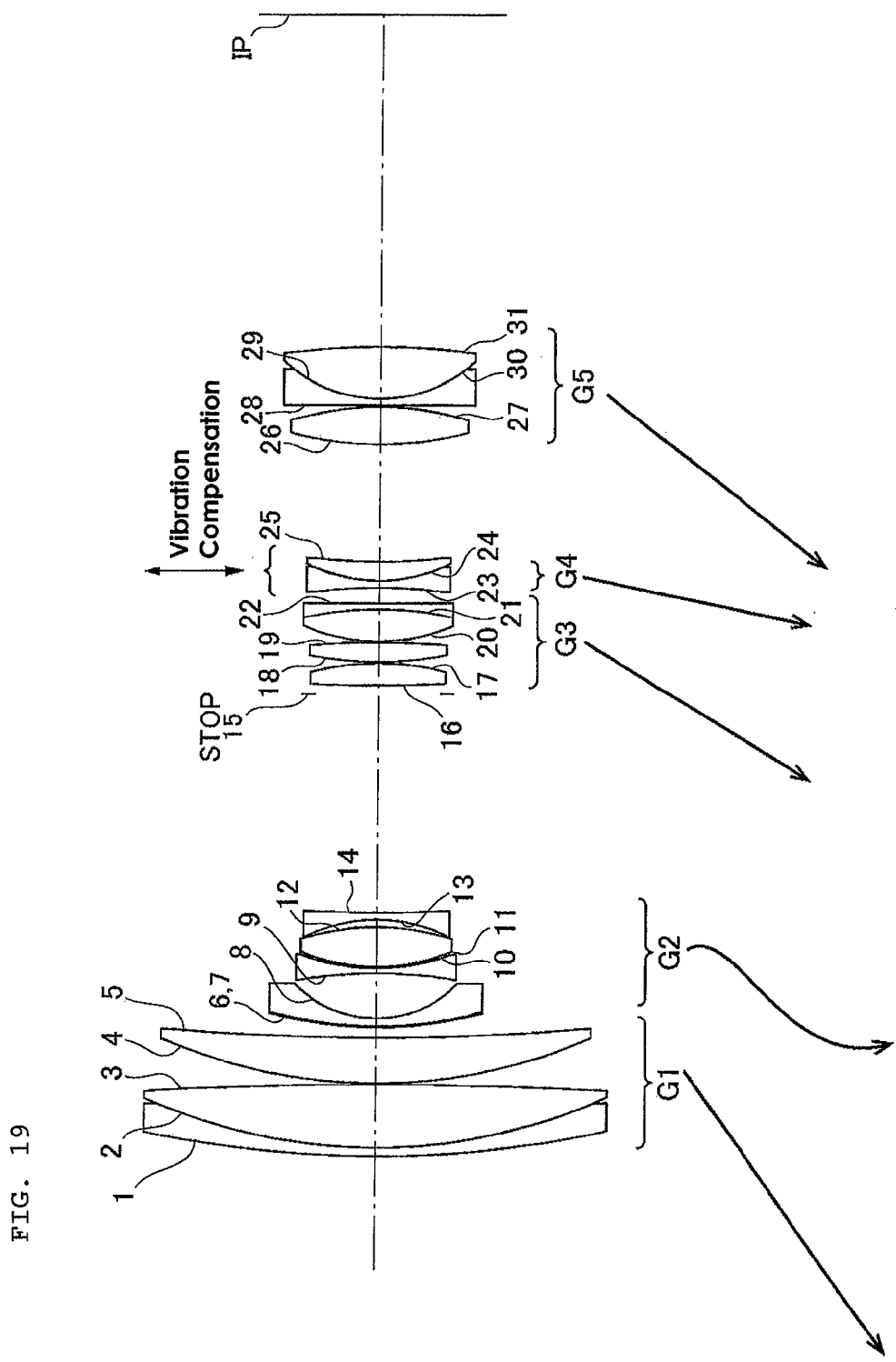
FIG. 19 is a cross-sectional view of optical system illustrating a lens cross section in infinity focusing at wide-angle end and movement of each lens group in zooming of the zoom lens according to the present invention in Example 10.

FIG. 19 shows a lens arrangement of the zoom lens in Example 10. As shown in FIG. 19, the zoom lens in Example 10 is constituted by the first lens group G1 having positive refracting power, the second lens group G2 having negative refracting power, the third lens group G3 having positive refracting power, the fourth lens group G4 having negative refracting power and the fifth lens group G5 as the lens group P having positive refracting power in order from the object side. Specific lens arrangement is shown in FIG. 19. The second lens group G2 is a focusing lens group, and the second lens group G2 moves along the optical axis in focusing from infinity to a close object the same as in Example 1. The fourth lens group G4 is a vibration compensation lens group the same as in Example 6. Movement of each lens group in magnification change is shown in FIG. 19.

(2) Optical Data

Optical data in Example 10 is shown below.
Focal length (f): 18.5-70.98-290.40
F number (Fno): 3.6-6.1-6.5
Half image viewing angle (ω): 40.00-11.21-2.78
Paraxial image height: 15.52-14.06-14.08

The zoom lens in Example 10 is a wide-angle high-magnification change-ratio zoom lens in which the image viewing angle at wide-angle end is 80.00° and the magnification change ratio is 15.70.

(3) Lens Data

Lens data of the zoom lens in Example 10 is shown in Table 28. The aspheric surface coefficient of each aspheric surface is shown in Table 29. Lens gap change at wide-angle end (f=18.5), intermediate focal length (f=70.98) and telephoto end (f=290.40) of the zoom lens in Example 10 is shown in Table 30.

TABLE 28

| NS | R | D | Nd | ABV |
|----|---|---|----|----|
| 1 | 132.9639 | 1.0000 | 2.00100 | 29.13 |
| 2 | 68.3316 | 7.3000 | 1.49700 | 81.61 |
| 3 | −520.2074 | 0.1500 | | |
| 4 | 64.7630 | 5.3000 | 1.72916 | 54.67 |
| 5 | 294.5995 | D(5) | | |
| 6 ASPH | 42.7141 | 0.1500 | 1.51460 | 49.96 |
| 7 | 49.1266 | 0.9000 | 1.88100 | 40.14 |
| 8 | 13.5086 | 5.2656 | | |
| 9 | −57.3040 | 0.6000 | 1.80420 | 46.50 |
| 10 | 25.9471 | 0.1500 | | |
| 11 | 23.3685 | 4.6362 | 1.84666 | 23.78 |
| 12 | −29.7886 | 0.8481 | | |
| 13 ASPH | −19.0176 | 0.8000 | 1.76802 | 49.24 |
| 14 ASPH | 132.9020 | D(14) | | |
| 15 STOP | 0.0000 | 1.0000 | | |
| 16 | 144.1295 | 2.5863 | 1.48749 | 70.44 |
| 17 | −31.4025 | 0.1500 | | |
| 18 | 42.2440 | 2.2577 | 1.49700 | 81.61 |
| 19 | −103.8836 | 0.1500 | | |
| 20 | 22.9043 | 3.7175 | 1.48749 | 70.44 |
| 21 | −41.0901 | 0.7000 | 1.84666 | 23.78 |
| 22 | 906.0425 | D(22) | | |
| 23 ASPH | −56.7814 | 0.8000 | 1.85135 | 40.10 |
| 24 | 19.2054 | 2.2217 | 1.80809 | 22.76 |
| 25 | 66.9960 | D(25) | | |
| 26 ASPH | 40.9894 | 4.3675 | 1.59201 | 67.02 |
| 27 ASPH | −32.8214 | 0.1500 | | |

TABLE 28-continued

| NS | R | D | Nd | ABV |
|---|---|---|---|---|
| 28 | 4004.8532 | 0.8000 | 1.91082 | 35.25 |
| 29 | 17.1408 | 5.9989 | 1.58144 | 40.89 |
| 30 | −86.7151 | D(30) | | |

TABLE 29

| ASPH | K<br>8(D) | 2(A)<br>10(E) | 4(B)<br>12(F) | 6(C) |
|---|---|---|---|---|
| 6 | −38.3729<br>2.91229e−009 | 0.00000e+000<br>−1.12546e−011 | 4.57034e−005<br>2.06133e−014 | −4.45303e−007 |
| 13 | −0.1079<br>2.41177e−009 | 0.00000e+000<br>−4.86189e−012 | 2.15442e−005<br>−2.69830e−014 | −2.77602e−007 |
| 14 | 0.0000<br>6.54446e−010 | 0.00000e+000<br>1.44901e−011 | −6.98078e−006<br>−9.91487e−014 | −1.80250e−007 |
| 23 | 0.5333<br>−1.46766e−009 | 0.00000e+000<br>2.33741e−011 | 8.57901e−006<br>−1.32737e−013 | 4.28112e−008 |
| 26 | 0.3734<br>7.53129e−010 | 0.00000e+000<br>−9.92714e−012 | −6.46570e−006<br>6.56135e−014 | −2.05390e−009 |
| 27 | −8.4571<br>1.10706e−009 | 0.00000e+000<br>−1.55391e−011 | −1.71438e−005<br>8.81382e−014 | 4.02178e−008 |

TABLE 30

| Focal Length | 18.4984 | 70.9837 | 290.3974 |
|---|---|---|---|
| D(5) | 1.2000 | 33.7215 | 66.7641 |
| D(14) | 25.3821 | 10.4668 | 1.3500 |
| D(22) | 1.8057 | 4.1823 | 2.7077 |
| D(25) | 13.6125 | 3.8779 | 1.2000 |
| D(31) | 38.2368 | 73.9956 | 88.3259 |

(4) Conditional Expression

Figure 20:
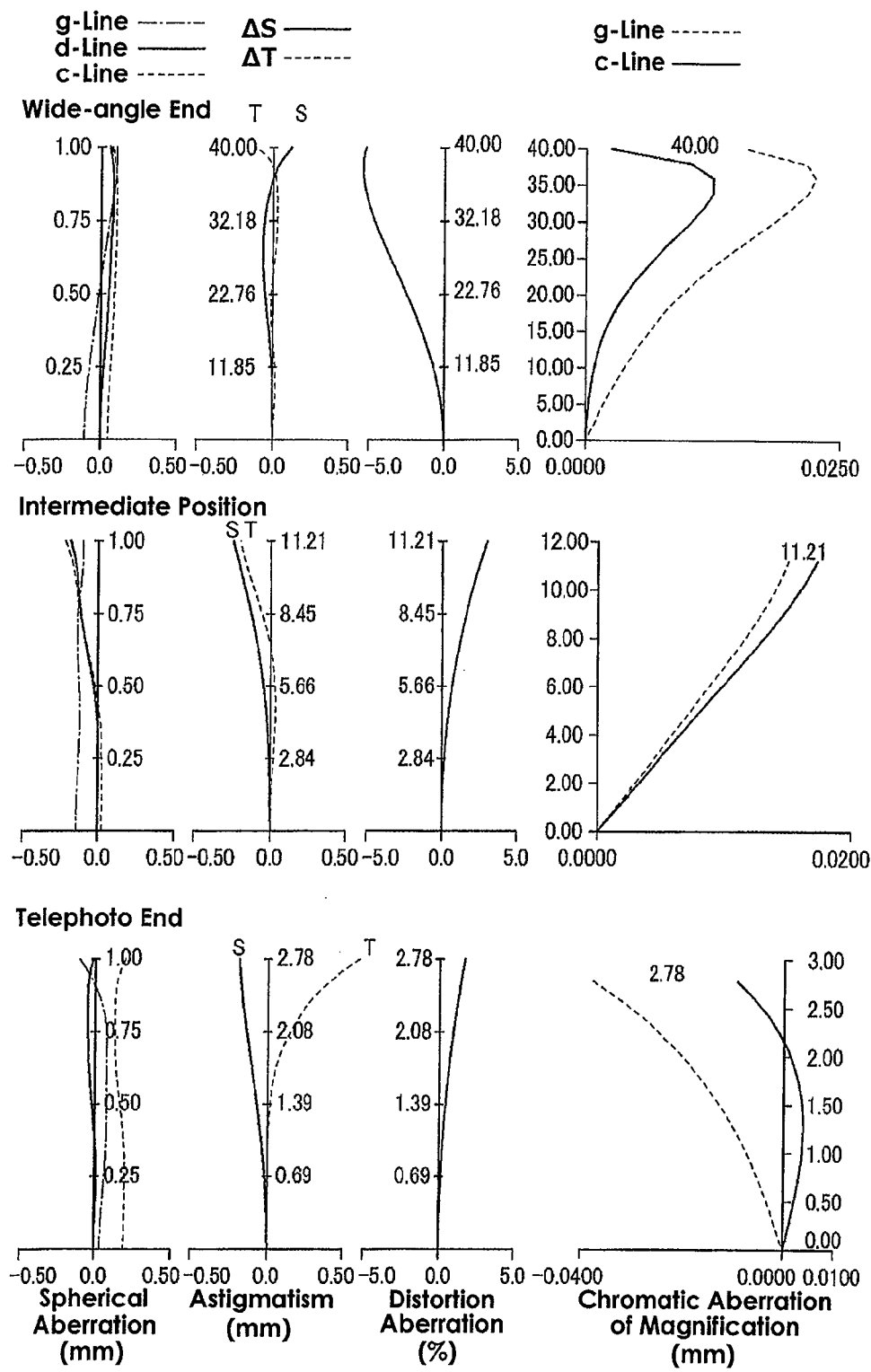
FIG. 20 is a spherical aberration diagram, astigmatism diagram, distortion aberration diagram and chromatic aberration of magnification diagram in infinity focusing at a wide-angle end, intermediate position and telephoto end of the zoom lens according to the present invention in 10.

The values of conditional expressions (1) to (8) in Example 10 are shown in Table 37. So, the zoom lens in Example 10 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 20.

Example 11

(1) Lens Arrangement of Zoom Lens

Figure 21:
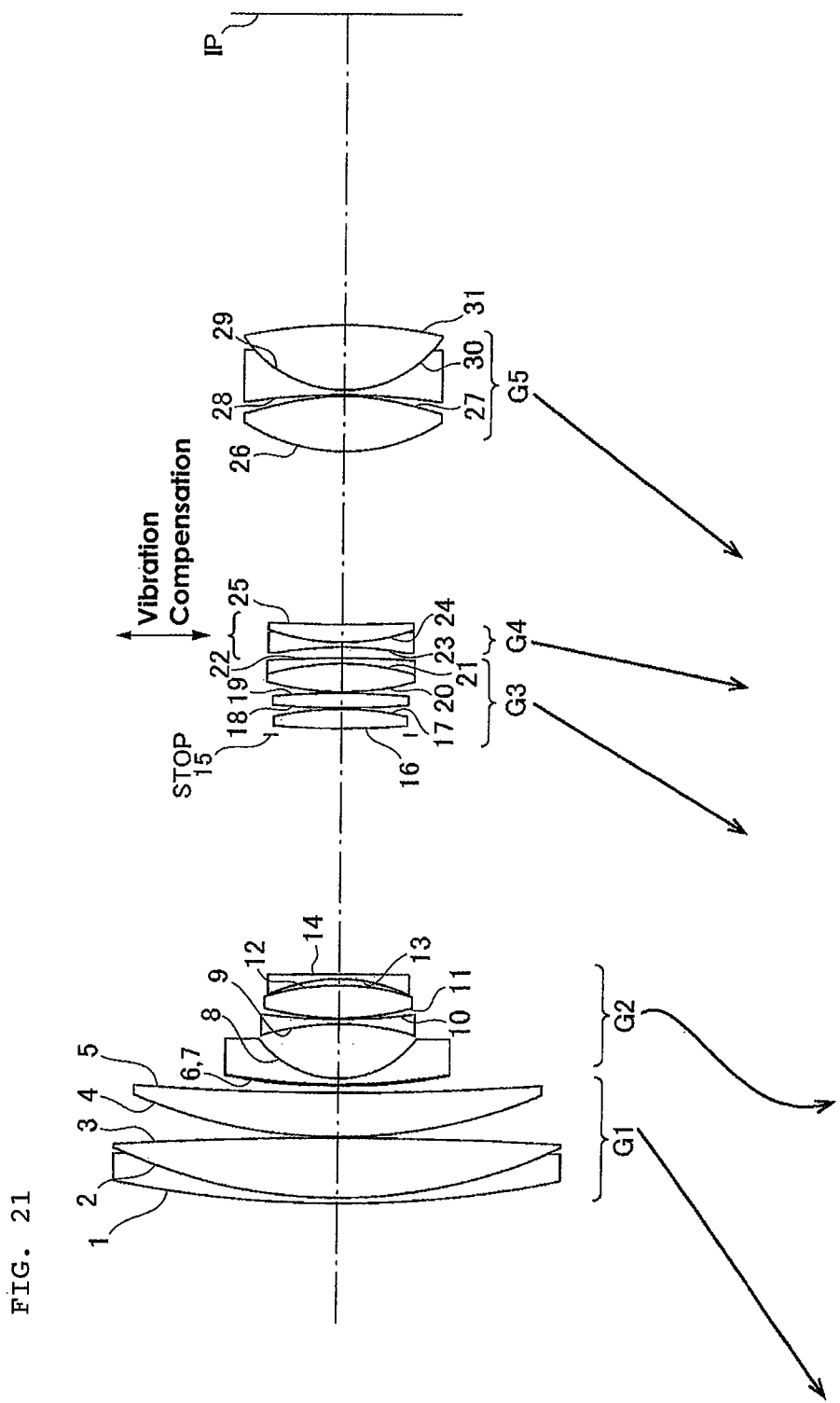
FIG. 21 is a cross-sectional view of optical system illustrating a lens cross section in infinity focusing at wide-angle end and movement of each lens group in zooming of the zoom lens according to the present invention in Example 11.

FIG. 21 shows a lens arrangement of the zoom lens in Example 11. As shown in FIG. 21, the zoom lens in Example 11 is constituted by the first lens group G1 having positive refracting power, the second lens group G2 having negative refracting power, the third lens group G3 having positive refracting power, the fourth lens group G4 having negative refracting power and the fifth lens group G5 as the lens group P having positive refracting power in order from the object side. Specific lens arrangement is shown in FIG. 21. The second lens group G2 is a focusing lens group, and the second lens group G2 moves along the optical axis in focusing from infinity to a close object the same as in Example 1. The fourth lens group G4 is a vibration compensation lens group the same as in Example 6. Movement of each lens group in magnification change is shown in FIG. 21.

(2) Optical Data

Optical data in Example 11 is shown below.
Focal length (f): 14.5-71.0-291.012
F number (Fno): 3.6-6.1-6.5
Half image viewing angle (ω): 45.3-11.22-2.81
Paraxial image height: 14.653-14.084-14.284

The zoom lens in Example 11 is a wide-angle high-magnification change-ratio zoom lens in which the image viewing angle at wide-angle end is 90.6° and the magnification change ratio is 20.07.

(3) Lens Data

Lens data of the zoom lens in Example 11 is shown in Table 31. The aspheric surface coefficient of each aspheric surface is shown in Table 32. Lens gap change at wide-angle end (f=14.5), intermediate focal length (f=71.0) and telephoto end (f=291.012) of the zoom lens in Example 11 is shown in Table 33.

TABLE 31

| NS | R | D | Nd | ABV |
|---|---|---|---|---|
| 1 | 141.7837 | 0.7000 | 2.00100 | 29.13 |
| 2 | 66.7479 | 7.4000 | 1.49700 | 81.61 |
| 3 | −511.8174 | 0.1500 | | |
| 4 | 66.3976 | 5.4000 | 1.77250 | 49.62 |
| 5 | 346.3826 | D(5) | | |
| 6 ASPH | 129.4466 | 0.1500 | 1.51460 | 49.96 |
| 7 | 84.4430 | 0.7000 | 1.80420 | 46.50 |
| 8 | 12.6842 | 6.6928 | | |
| 9 | −34.9635 | 0.6000 | 1.77250 | 49.62 |
| 10 | 78.7991 | 0.1500 | | |
| 11 | 36.2978 | 4.0000 | 1.84666 | 23.78 |
| 12 | −32.3430 | 0.7977 | | |
| 13 ASPH | −20.6288 | 0.6000 | 1.76802 | 49.24 |
| 14 ASPH | −436.8784 | D(14) | | |
| 15 STOP | 0.0000 | 0.8000 | | |
| 16 | 106.4105 | 2.3767 | 1.59282 | 68.62 |
| 17 | −40.2232 | 0.1500 | | |
| 18 | 100.0000 | 1.8257 | 1.49700 | 81.61 |
| 19 | −100.0000 | 0.1500 | | |
| 20 | 35.4356 | 3.4895 | 1.49700 | 81.61 |
| 21 | −33.6391 | 0.7000 | 1.90366 | 31.31 |
| 22 | −141.9854 | D(22) | | |
| 23 ASPH | −46.9649 | 0.6000 | 1.85135 | 40.10 |
| 24 | 28.5003 | 2.2105 | 1.80809 | 22.76 |
| 25 | 218.6238 | D(25) | | |
| 26 ASPH | 23.6748 | 6.8541 | 1.59201 | 67.02 |
| 27 ASPH | −29.7539 | 0.1500 | | |

TABLE 31-continued

| NS | R | D | Nd | ABV |
|---|---|---|---|---|
| 28 | −87.7357 | 0.6000 | 1.91082 | 35.25 |
| 29 | 15.4273 | 8.0000 | 1.58144 | 40.89 |
| 30 | −59.9671 | D(30) | | |

TABLE 32

| ASPH | K<br>8(D) | 2(A)<br>10(E) | 4(B)<br>12(F) | 6(C) |
|---|---|---|---|---|
| 6 | −99.0000<br>−9.19076e−010 | 0.00000e+000<br>5.32198e−012 | 2.85897e−005<br>−1.050080e−014 | −1.32366e−008 |
| 13 | 0.2931<br>1.43528e−009 | 0.00000e+000<br>−2.69511e−011 | 5.09953e−006<br>1.339415e−013 | 1.47454e−007 |
| 14 | 0.0000<br>−1.88006e−009 | 0.00000e+000<br>5.62570e−012 | −8.86619e−006<br>1.328658e−014 | 2.16298e−007 |
| 23 | 3.5377<br>−3.03130e−009 | 0.00000e+000<br>3.18948e−011 | 7.02309e−006<br>−1.250034e−013 | 1.36808e−007 |
| 26 | 0.2234<br>1.89681e−009 | 0.00000e+000<br>−1.28091e−011 | −2.77339e−006<br>3.115073e−014 | −9.45443e−008 |
| 27 | −8.2324<br>1.10627e−009 | 0.00000e+000<br>−9.87631e−012 | −1.46237e−005<br>2.604697e−014 | 4.07525e−008 |

TABLE 33

| Focal Length | 14.500 | 71.000 | 291.012 |
|---|---|---|---|
| D(5) | 0.9000 | 29.5935 | 67.9925 |
| D(14) | 29.6034 | 9.1189 | 1.0000 |
| D(22) | 1.3378 | 9.1198 | 5.0958 |
| D(25) | 21.4302 | 3.2480 | 1.0000 |
| D(31) | 38.2175 | 89.2477 | 98.3899 |

(4) Conditional Expression

Figure 22:
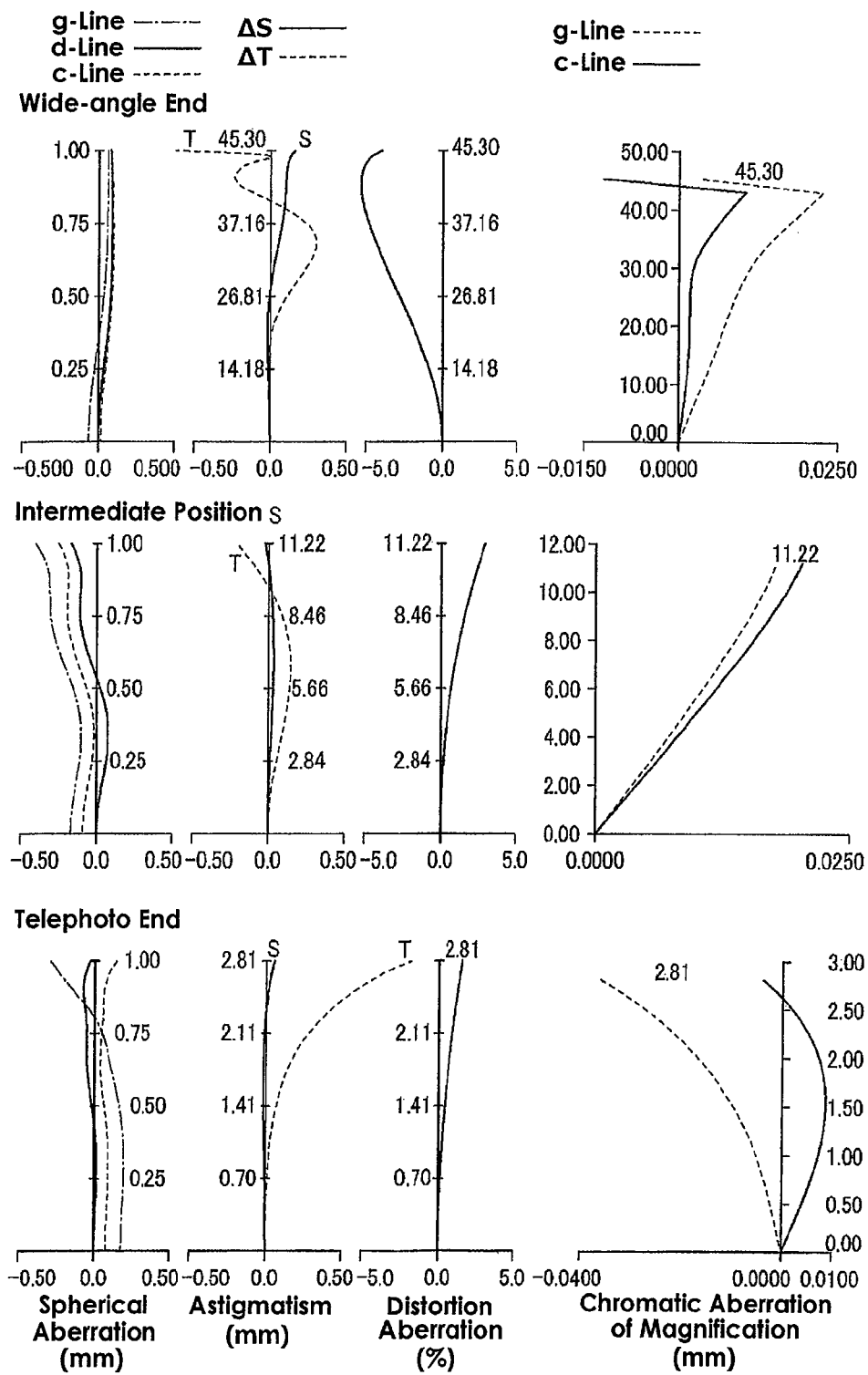
FIG. 22 is a spherical aberration diagram, astigmatism diagram, distortion aberration diagram and chromatic aberration of magnification diagram in infinity focusing at a wide-angle end, intermediate position and telephoto end of the zoom lens according to the present invention in 11.

The values of conditional expressions (1) to (8) in Example 11 are shown in Table 37. So, the zoom lens in Example 11 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 22.

Example 12

(1) Lens Arrangement of Zoom Lens

Figure 23:
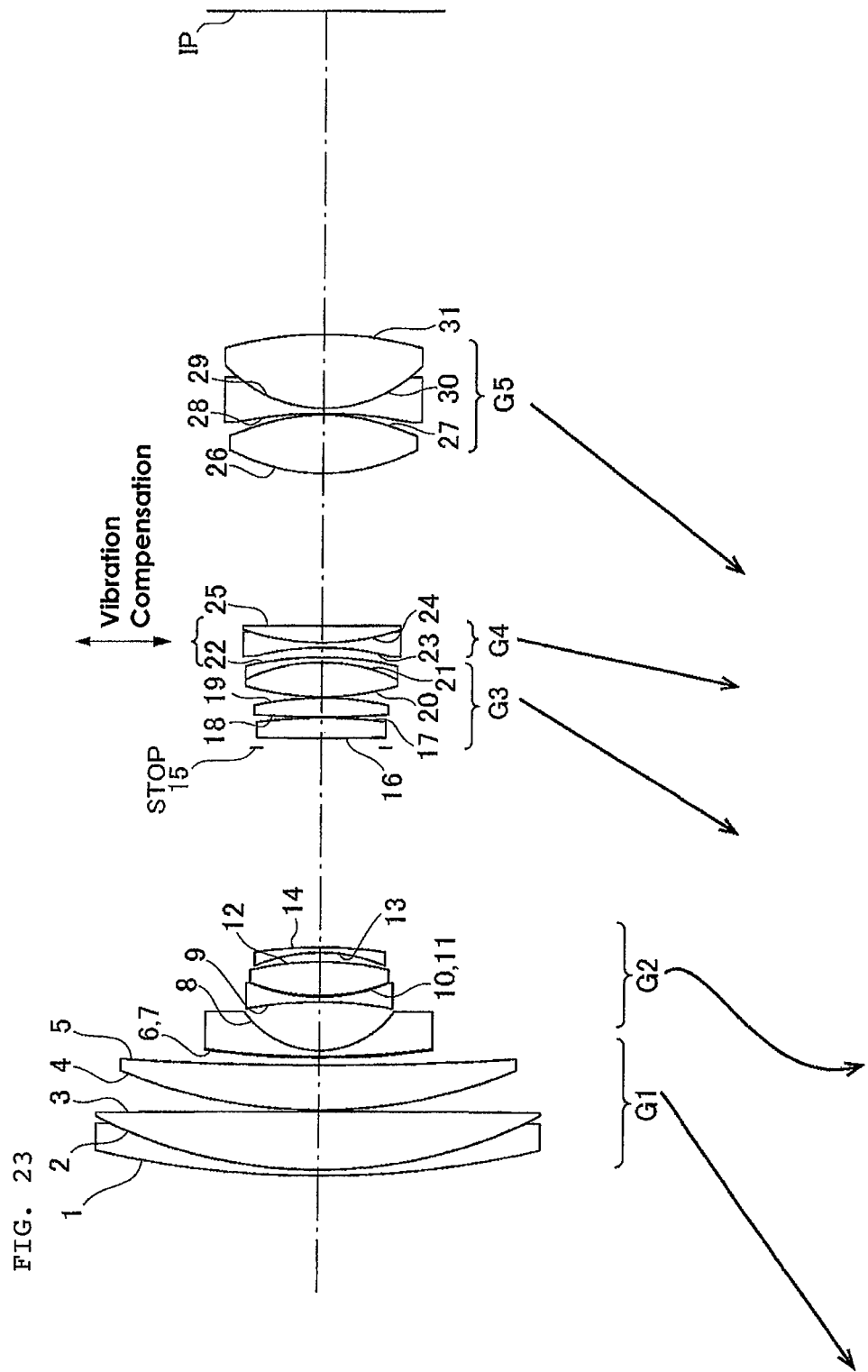
FIG. 23 is a cross-sectional view of optical system illustrating a lens cross section in infinity focusing at wide-angle end and movement of each lens group in zooming of the zoom lens according to the present invention in Example 12.

FIG. 23 shows a lens arrangement of the zoom lens in Example 12. As shown in FIG. 23, the zoom lens in Example 12 is constituted by the first lens group G1 having positive refracting power, the second lens group G2 having negative refracting power, the third lens group G3 having positive refracting power, the fourth lens group G4 having negative refracting power and the fifth lens group G5 as the lens group P having positive refracting power in order from the object side. Specific lens arrangement is shown in FIG. 23. The second lens group G2 is a focusing lens group, and the second lens group G2 moves along the optical axis in focusing from infinity to a close object the same as in Example 1. The fourth lens group G4 is a vibration compensation lens group the same as in Example 6. Movement of each lens group in magnification change is shown in FIG. 23.

(2) Optical Data

Optical data in Example 12 is shown below.
Focal length (f): 13.5-71.0-194.0
F number (Fno): 3.6-6.1-6.5
Half image viewing angle (ω): 47.1-11.20-4.19
Paraxial image height: 14.532-14.058-14.21

The zoom lens in Example 11 is a wide-angle high-magnification change-ratio zoom lens in which the image viewing angle at wide-angle end is 90.6° and the magnification change ratio is 14.37.

(3) Lens Data

Lens data of the zoom lens in Example 12 is shown in Table 34. The aspheric surface coefficient of each aspheric surface is shown in Table 35. Lens gap change at wide-angle end (f=13.5), intermediate focal length (f=71.0) and telephoto end (f=194.0) of the zoom lens in Example 12 is shown in Table 36.

TABLE 34

| NS | R | D | Nd | ABV |
|---|---|---|---|---|
| 1 | 122.4296 | 0.7000 | 2.00100 | 29.13 |
| 2 | 60.3895 | 7.0000 | 1.49700 | 81.61 |
| 3 | −2792.1592 | 0.1500 | | |
| 4 | 64.5622 | 5.3000 | 1.77250 | 49.62 |
| 5 | 391.0164 | D(5) | | |
| 6 ASPH | 180.9426 | 0.1500 | 1.51460 | 49.96 |
| 7 | 107.5801 | 0.7000 | 1.77250 | 49.62 |
| 8 | 11.6214 | 5.7477 | | |
| 9 | −52.6829 | 0.6000 | 1.80420 | 46.50 |
| 10 | 22.7258 | 0.1335 | | |
| 11 | 23.8213 | 4.0000 | 1.84666 | 23.78 |
| 12 | −38.8676 | 1.1238 | | |
| 13 ASPH | −20.3195 | 0.6000 | 1.76802 | 49.24 |
| 14 ASPH | −60.5621 | D(14) | | |
| 15 STOP | 0.0000 | 1.1378 | | |
| 16 | 301.4888 | 2.4055 | 1.48749 | 70.44 |
| 17 | −72.7901 | 0.1500 | | |
| 18 | 115.3672 | 2.2588 | 1.49700 | 81.61 |
| 19 | −39.4036 | 0.1500 | | |
| 20 | 34.7714 | 4.0999 | 1.49700 | 81.61 |
| 21 | −22.5064 | 0.6000 | 1.90366 | 31.31 |
| 22 | −42.9800 | D(22) | | |
| 23 ASPH | −33.1098 | 0.6000 | 1.85135 | 40.10 |
| 24 | 31.3238 | 2.0018 | 1.80809 | 22.76 |
| 25 | 3706.5583 | D(25) | | |
| 26 ASPH | 24.2771 | 7.0099 | 1.59201 | 67.02 |
| 27 ASPH | −23.1765 | 0.1500 | | |

TABLE 34-continued

| NS | R | D | Nd | ABV |
|---|---|---|---|---|
| 28 | −55.7594 | 0.6000 | 1.91082 | 35.25 |
| 29 | 16.9455 | 8.8000 | 1.58144 | 40.89 |
| 30 | −46.9580 | D(30) | | |

TABLE 35

| ASPH | K<br>8(D) | 2(A)<br>10(E) | 4(B)<br>12(F) | 6(C) |
|---|---|---|---|---|
| 6 | −99.0000<br>−5.70933e−010 | 0.00000e+000<br>5.67135e−012 | 3.73884e−005<br>−1.489611e−014 | −1.31057e−007 |
| 13 | 0.0310<br>−5.32459e−010 | 0.00000e+000<br>−2.20328e−011 | 1.23422e−005<br>2.834811e−013 | 1.82506e−007 |
| 14 | 0.0000<br>−3.32314e−009 | 0.00000e+000<br>−5.29621e−012 | −7.22127e−006<br>2.913524e−013 | 1.53650e−007 |
| 23 | 1.4916<br>−2.61940e−009 | 0.00000e+000<br>2.92014e−011 | 1.13208e−005<br>−1.234635e−013 | 1.18696e−007 |
| 26 | −0.0322<br>1.89532e−009 | 0.00000e+000<br>−1.40986e−011 | −7.27091e−006<br>3.662934e−014 | −7.41795e−008 |
| 27 | −4.5922<br>9.41182e−010 | 0.00000e+000<br>−9.62111e−012 | −1.64308e−005<br>2.753949e−014 | 5.50200e−008 |

TABLE 36

| Focal Length | 13.500 | 71.000 | 194.000 |
|---|---|---|---|
| D(5) | 0.9000 | 28.3004 | 61.3698 |
| D(14) | 23.8118 | 4.7004 | 1.0000 |
| D(22) | 1.1483 | 10.5493 | 9.5845 |
| D(25) | 18.2272 | 2.9675 | 1.0000 |
| D(31) | 38.2441 | 93.2723 | 96.3600 |

(4) Conditional Expression

Figure 24:
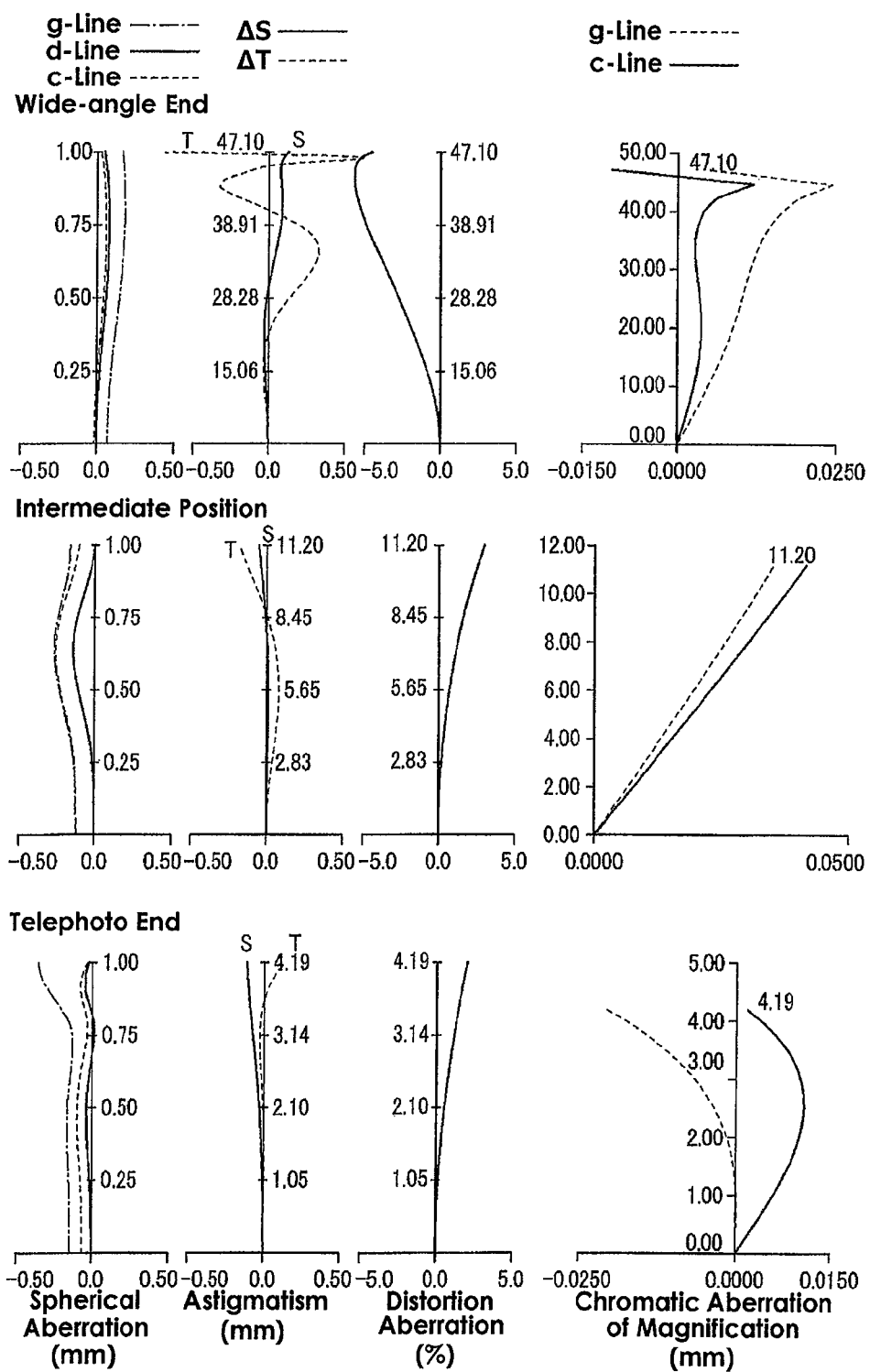
FIG. 24 is a spherical aberration diagram, astigmatism diagram, distortion aberration diagram and chromatic aberration of magnification diagram in infinity focusing at a wide-angle end, intermediate position and telephoto end of the zoom lens according to the present invention in 12.

The values of conditional expressions (1) to (8) in Example 12 are shown in Table 37. So, the zoom lens in Example 12 has excellent imaging performance at wide-angle end, intermediate position and telephoto end since the values are all in the ranges described above and spherical aberration, astigmatism, distortion aberration and chromatic aberration of magnification in infinity focusing are as shown in FIG. 24.

The present invention provides a miniature telephoto-type zoom lens employing a so-called telephoto-type system achieved both high imaging performance and high magnification change ratio through minimum movement of each lens group in zooming; and an imaging apparatus equipped with the zoom lens. So, the zoom lens is suitable for a miniature imaging apparatus, for example.

SYMBOL LIST

G1 First lens group
G2 Second lens group
G3 Third lens group
G4 Fourth lens group
G5 Fifth lens group
STOP Stop
IP Image plane

The invention claimed is:
1. A zoom lens comprising:
a first lens group having positive refracting power, a second lens group having negative refracting power and a third lens group having positive refracting power in order from an object side; and a lens group P having positive refracting power is arranged closer to an image plane side than the third lens group,

TABLE 37

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| βrw | −0.862 | −0.904 | −0.914 | −0.883 | −0.945 | −0.952 | −1.028 | −1.019 | −1.069 | −1.178 | −0.963 | −0.959 |
| β2w/tanθw | −0.154 | −0.16 | −0.176 | −0.181 | −0.205 | −0.144 | −0.15 | −0.15 | −0.158 | −0.187 | −0.149 | −0.132 |
| Fp/√(fw * ft) | 0.692 | 0.713 | 0.724 | 0.693 | 0.678 | 0.704 | 0.716 | 0.704 | 0.699 | 0.688 | 0.68 | 0.767 |
| f1/√(fw * ft) | 1.988 | 2.002 | 1.802 | 1.652 | 1.477 | 1.621 | 1.576 | 1.537 | 1.477 | 1.369 | 1.542 | 1.94 |
| mp/m3 | 1.11 | 1.126 | 1.126 | 1.107 | 1.096 | 1.322 | 1.308 | 1.331 | 1.323 | 1.299 | 1.383 | 1.178 |
| (β2t/β2w)/(ft/fw) | 0.307 | 0.335 | 0.342 | 0.336 | 0.33 | 0.294 | 0.307 | 0.318 | 0.332 | 0.374 | 0.292 | 0.273 |
| F2/√(fw * ft) | −0.253 | −0.251 | −0.234 | −0.221 | −0.208 | −0.195 | −0.185 | −0.18 | −0.174 | −0.169 | −0.188 | −0.225 |
| β2t | −0.658 | −0.658 | −0.735 | −0.847 | −0.927 | −0.816 | −0.801 | −0.869 | −0.912 | −0.921 | −0.885 | −0.557 | wherein the zoom lens satisfies conditional expressions (1) to (3) described below:

$$-1.30 < \beta rw < -0.80 \quad (1)$$

$$-0.21 < \beta 2w/\tan \theta w < -0.12 \quad (2)$$

$$0.55 < fp/\sqrt{(fw \times ft)} < 1.20 \quad (3)$$

where
βrw: Synthetic lateral magnification at wide-angle end of all lens groups arranged closer to image plane side than the second lens group
β2w: Lateral magnification of the second lens group at wide-angle end
θw: Half image viewing angle of most off-axis beam at wide-angle end
fp: Focal length of the lens group P
fw: Focal length of entire optical system at wide-angle end
ft: Focal length of entire optical system at telephoto end.

2. The zoom lens according to claim 1, wherein the zoom lens satisfies conditional expression (4) described below:

$$1.33 < f1/\sqrt{(fw \times ft)} < 2.20 \quad (4)$$

where
f1: Focal length of the first lens group.

3. The zoom lens according to claim 1, wherein the third lens group and the lens group P satisfy conditional expression (5) described below:

$$1.05 < mp/m3 < 1.50 \quad (5)$$

where
mp: Movement of the lens group P in magnification change from wide-angle end to telephoto end
m3: Movement of the third lens group in magnification change from wide-angle end to telephoto end.

4. The zoom lens according to claim 1, wherein the zoom lens satisfies conditional expression (6) described below:

$$0.23 < \beta 2t/\beta 2w)/(ft/fw) < 0.50 \quad (6)$$

where
β2t: Lateral magnification at telephoto end of the second lens group.

5. The zoom lens according to claim 1, wherein the zoom lens satisfies conditional expression (7) described below:

$$-0.30 < f2/\sqrt{(fw \times ft)} < -0.16 \quad (7)$$

where
f2: Focal length of the second lens group.

6. The zoom lens according to claim 1, wherein at least one surface of a lens arranged closest to an image plane side in the second lens group is aspheric.

7. The zoom lens according to claim 1, wherein
focusing from infinity to a close object is performed by moving the second lens group along an optical axis; and
the zoom lens satisfies conditional expression (8) described below:

$$-0.99 < \beta 2t < -0.50 \quad (8)$$

where
β2t: Lateral magnification at telephoto end of the second lens group.

8. An imaging apparatus equipped with a zoom lens according to claim 1 and an image sensor that converts an optical image formed on an image plane side by the zoom lens into an electrical signal.

* * * * *

UNITED STATES PATENT AND TRADEMARK OFFICE
CERTIFICATE OF CORRECTION

PATENT NO. : 9,507,132 B2  Page 1 of 1
APPLICATION NO. : 14/565980
DATED : November 29, 2016
INVENTOR(S) : Yoshito Iwasawa et al.

It is certified that error appears in the above-identified patent and that said Letters Patent is hereby corrected as shown below:

In the Claims

Column 38, Line 5, Claim 4, delete "$0.23<\beta 2t/\ \beta 2w)/(ft/fw)<0.50$" and insert
-- $0.23<(\beta 2t/\ \beta 2w)/(ft/fw)<0.50$ --

Signed and Sealed this
Twenty-eighth Day of March, 2017

Michelle K. Lee
*Director of the United States Patent and Trademark Office*